(12) United States Patent
Yanagihara et al.

(10) Patent No.: US 11,367,875 B2
(45) Date of Patent: Jun. 21, 2022

(54) POSITIVE ELECTRODE ACTIVE MATERIAL, POSITIVE ELECTRODE, BATTERY, BATTERY PACK, ELECTRONIC DEVICE, ELECTRIC VEHICLE, POWER STORAGE DEVICE, AND POWER SYSTEM

(71) Applicant: MURATA MANUFACTURING CO., LTD., Kyoto (JP)

(72) Inventors: Asuki Yanagihara, Kyoto (JP); Yosuke Hosoya, Kyoto (JP); Yuki Niwata, Kyoto (JP); Ravi Gehlot, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 260 days.

(21) Appl. No.: 16/804,359

(22) Filed: Feb. 28, 2020

(65) Prior Publication Data
US 2020/0203727 A1    Jun. 25, 2020

Related U.S. Application Data

(63) Continuation of application No. PCT/JP2018/031587, filed on Aug. 27, 2018.

(30) Foreign Application Priority Data

Aug. 30, 2017 (JP) .............................. JP2017-166255

(51) Int. Cl.
*H01M 4/525* (2010.01)
*C01G 51/00* (2006.01)
(Continued)

(52) U.S. Cl.
CPC ............ *H01M 4/525* (2013.01); *C01G 51/00* (2013.01); *C01G 53/00* (2013.01); *H01M 4/131* (2013.01);
(Continued)

(58) Field of Classification Search
None
See application file for complete search history.

(56) References Cited

U.S. PATENT DOCUMENTS

| 2002/0150530 A1 | 10/2002 | Gao et al. |
| 2010/0247986 A1 | 9/2010 | Toyama et al. |

(Continued)

FOREIGN PATENT DOCUMENTS

| JP | H0536411 A | 2/1993 |
| JP | 3054829 B2 | 6/2000 |

(Continued)

OTHER PUBLICATIONS

Japanese Office Action dated Mar. 16, 2021 in corresponding Japanese Application No. 2019-539492.
(Continued)

*Primary Examiner* — Daniel S Gatewood
(74) *Attorney, Agent, or Firm* — K&L Gates LLP

(57) ABSTRACT

A positive electrode active material includes powder of composite particles including a lithium transition metal composite oxide having a lamellar rock-salt structure and a spinel phase. The spinel phase includes an oxide including lithium and at least a first element X1 selected from the group consisting of magnesium, aluminum, titanium, manganese, yttrium, zirconium, molybdenum, and tungsten, and the lithium transition metal composite oxide includes nickel or cobalt and the first element X1.

15 Claims, 8 Drawing Sheets

(51) Int. Cl.
  *C01G 53/00* (2006.01)
  *H01M 4/131* (2010.01)
  *H01M 4/36* (2006.01)
  *H01M 4/485* (2010.01)
  *H01M 4/505* (2010.01)
  *H01M 4/62* (2006.01)
  *H01M 10/0525* (2010.01)
  *H01M 50/20* (2021.01)

(52) U.S. Cl.
  CPC ........... *H01M 4/362* (2013.01); *H01M 4/485* (2013.01); *H01M 4/505* (2013.01); *H01M 4/62* (2013.01); *H01M 10/0525* (2013.01); *H01M 50/20* (2021.01); *C01P 2002/32* (2013.01)

(56) References Cited

U.S. PATENT DOCUMENTS

2014/0154555 A1* 6/2014 Endoh .................. H01M 4/505
                                                          429/150

2016/0028123 A1    1/2016  Kawasaki et al.

FOREIGN PATENT DOCUMENTS

| | | | |
|---|---|---|---|
| JP | 3192855 B2 | 7/2001 | |
| JP | 2006164758 A | 6/2006 | |
| JP | 4106186 B2 | 6/2008 | |
| JP | 2009129721 A | 6/2009 | |
| JP | 2010232001 A | 10/2010 | |
| JP | 2016143539 A * | 8/2016 | ............. H01M 4/36 |
| JP | 2016143539 A | 8/2016 | |
| JP | 6611438 B2 * | 11/2019 | ........... H01M 4/525 |
| WO | 2014133163 A1 | 9/2014 | |

OTHER PUBLICATIONS

Japanese Office Action dated Oct. 26, 2021 in corresponding Japanese Application No. 2019-539492.
International Search Report for Application No. PCT/JP2018/031587, dated Nov. 27, 2018.

* cited by examiner

POSITIVE ELECTRODE ACTIVE MATERIAL, POSITIVE ELECTRODE, BATTERY, BATTERY PACK, ELECTRONIC DEVICE, ELECTRIC VEHICLE, POWER STORAGE DEVICE, AND POWER SYSTEM

CROSS REFERENCE TO RELATED APPLICATIONS

The present application is a continuation of PCT patent application no. PCT/JP2018/031587, filed on Aug. 27, 2018, which claims priority to Japanese patent application no. JP2017-166255 filed on Aug. 30, 2017, the entire contents of which are being incorporated herein by reference.

BACKGROUND

The present disclosure generally relates to a positive electrode active material, a positive electrode, a battery, a battery pack, an electronic device, an electric vehicle, a power storage device, and a power system.

Lithium ion secondary batteries characteristically have a higher energy density by use of a higher voltages than the other battery mechanisms, and therefore are popularly applied to mobile information terminals, electric tools, electric automobiles, stationary power storage systems, and the like. On the other hand, various studies have been conducted for the purposes of improving the lithium ion secondary batteries with higher performance and wider applicability. For examples, it has been studied to increase the energy density of a positive electrode active material by increasing a charging voltage or the like, in order to attain a high capacity of a lithium ion secondary battery.

However, such lithium ion secondary battery with a high capacity would have such a drawback that, in case where the lithium ion secondary battery has been repeatedly charged and discharged, capacity deterioration would occur, thereby deteriorating a charging and discharging cycle property. Furthermore, such lithium ion secondary battery would also have such a drawback that a heat-retaining property would deteriorate, that is, the capacity would be deteriorated due to internal resistance increases in a case where the battery is stored in a charged state.

SUMMARY

The present disclosure generally relates to a positive electrode active material, a positive electrode, a battery, a battery pack, an electronic device, an electric vehicle, a power storage device, and a power system.

The conventional technology is not sufficient in a cycle property in a high-temperature environment.

Therefore, an object of the present disclosure is to provide a positive electrode active material, a positive electrode, a battery, a battery pack, an electronic device, an electric vehicle, a power storage device, and a power system, each of which can improve the cycle property and the storage property at a high temperature.

According to an embodiment of the present disclosure, a positive electrode active material is provided. The positive electrode active material includes powder of composite particles including a lithium transition metal composite oxide having a lamellar rock-salt structure and a spinel phase. The spinel phase includes an oxide including lithium and at least a first element X1 selected from the group consisting of magnesium, aluminum, titanium, manganese, yttrium, zirconium, molybdenum, and tungsten, and the lithium transition metal composite oxide mainly includes nickel or cobalt and the first element X1.

According to an embodiment of the present disclosure, a positive electrode of the present disclosure includes a positive electrode active material according to an embodiment as described herein.

According to an embodiment of the present disclosure, a battery of the present disclosure includes the positive electrode having a positive electrode active material according to an embodiment as described herein, a negative electrode, and an electrolyte.

According to an embodiment of the present disclosure, a battery pack of the present disclosure includes the battery as described herein and a controller configured to control the battery.

According to an embodiment of the present disclosure, an electronic device of the present disclosure includes the battery as described herein and the electronic device being configured to receive power supply from the battery.

According to an embodiment of the present disclosure, an electric vehicle of the present disclosure includes the battery as described herein, a converter configured to receive power supply from the battery and convert the power into a driving power for the vehicle; and a controller configured to perform information processing for vehicle control on the basis of information on the battery.

According to an embodiment of the present disclosure, a power storage device of the present disclosure includes the battery as described herein, and the power storage device being configured to provide power supply to an electronic device connected to the battery.

According to an embodiment of the present disclosure, a power system of the present disclosure includes the battery as described herein and the power system being configured to receive power supply from the battery.

According to the present disclosure, an excellent charging and discharging cycle property with high capacity can be attained, while the deterioration during storage can be reduced at the same time. It should be noted that the advantageous effect described herein is not to limit the present invention, and the present invention may have only any one of advantageous effects described in the present disclosure, or may have an advantageous effect different from the advantageous effects described in the present disclosure.

DETAILED DESCRIPTION

Figure 1:
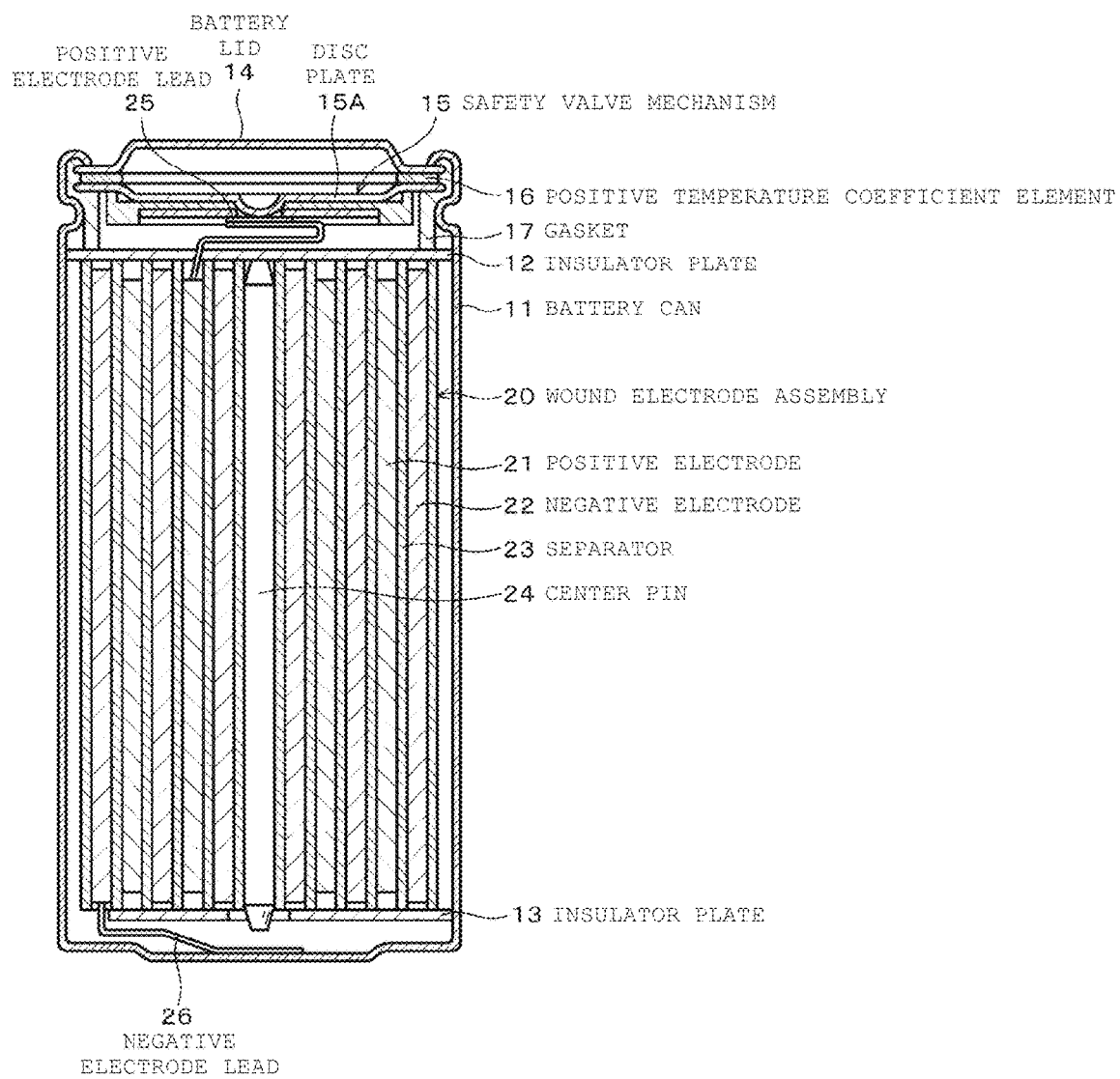
FIG. 1 is a cross-sectional view illustrating an example of a configuration of a non-aqueous electrolyte battery according to an embodiment of the present disclosure.

As described herein, the present disclosure will be described based on examples with reference to the drawings, but the present disclosure is not to be considered limited to the examples, and various numerical values and materials in the examples are considered by way of example.

It is possible to improve an energy density of a battery by configuring the battery with an appropriately designed ratio between a positive electrode and a negative electrode with an active material whose main component is a lithium transition metal composite oxide such as $LiCoO_2$ and $LiNiO_2$, so that charging will be conducted with a maximum charging voltage of 4.20 V or more, preferably 4.35 V or more, more preferably 4.40 V or more.

However, the higher charging voltage will result in a greater reactivity at a boundary between the positive electrode active material and an electrolyte solution, so that the transition metal component would elute out from the positive electrode, thereby deteriorating the active material or causing precipitation of the eluted metal on a negative electrode side, so that intercalation and deintercalation of Li would be retarded, or thereby accelerating a decomposition reaction of the electrolyte solution at a solid and a liquid interface in a battery stored in a charging state, so that a film would be produced on a surface so as to increase an internal resistance. That is, in a case where the battery is repeatedly charged and discharged in a high charging voltage state equal to or greater than 4.25 V, a greater amount of Li extraction would result in a higher reactivity at the boundary between the active material and the electrolyte, which would result in deterioration of the active material or the electrolyte solution in charging, thereby resulting in shorter charging and discharging cycle life or deterioration of the storage property.

In view of these drawbacks, the present inventors have diligently studied to find that composite particles compositely including a lithium transition metal composite oxide having a lamellar rock-salt structure and a cubical crystal spinel phase crystal phase having Li and a particular element X1 (hereinafter, this phase will be referred to as a "spinel phase") in combination are configured to include the particular element X1 also in the lithium transition metal composite oxide as well, thereby attaining a positive electrode active material that can reduce the deterioration of the cycle property and storage property even if the battery is used with a high charging voltage, and therefore can attain both of the high capacity and the battery properties.

The positive electrode active material according to a first exemplary embodiment of the present disclosure includes powder of composite particles in which a lithium transition metal composite oxide having a lamellar rock-salt structure, and a spinel phase are composite in combination. The composite particles may have a crystal grain boundary.

What is meant by "compositely including the lithium transition metal composite oxide and the spinel phase in combination" is that the lithium transition metal composite oxide and the spinel phase are integrated as one particle. Examples of such composite particles include, but not limited to, particles in which the spinel phase exists on at least part of surfaces of particles including the lithium transition metal composite oxide (hereinafter, simply referred to as "lithium transition metal composite oxide particles"), and particles in which the spinel phase exists on at least part of surfaces of the lithium transition metal composite oxide particles and also inside the lithium transition metal composite oxide particles, and the like.

The spinel phase includes an oxide including at least one element X1 selected from the group consisting of lithium (Li), magnesium (Mg), aluminum (Al), titanium (Ti), manganese (Mn), yttrium (Y), zirconium (Zr), molybdenum (Mo), and tungsten (W).

The spinel phase, for example, may have an average composition represented by the following formula (1).

$$Li_vMn_{2-w}M1_wO_xF_y \qquad (1)$$

(where M1 is at least one selected from the group consisting of cobalt (Co), nickel (Ni), magnesium (Mg), aluminum (Al), boron (B), titanium (Ti), vanadium (V), chrome (Cr), iron (Fe), copper (Cu), zinc (Zn), molybdenum (Mo), tin (Sn), calcium (Ca), strontium (Sr), and tungsten (W), and v, w, x, and y are values within such ranges that $0.9 \leq v \leq 1.1$, $0 \leq w < 0.6$, $3.7 \leq x \leq 4.1$, and $0 \leq y \leq 0.1$, where a lithium composition varies depending on a charging and discharging state, and v indicates a value in a full discharging state.)

A content amount of the spinel phase in the composite particles is preferably not less than 80 ppm but not more than 1200 ppm. If the content amount of the spinel phase is less than 80 ppm, it would possibly become unable to sufficiently down-regulate the decomposition reaction of the lithium transition metal composite oxide, the electrolyte, and/or the like. On the other hand, if the content amount of the spinel phase was more than 1200 ppm, the resistance would be so increased that the cycle property would be adversely affected.

It is preferable that the spinel phase be eccentrically populated to be more abundant on the surfaces of the composite particles. This is because it is considered that the spinel phase functions to down-regulate proceedings of the decomposition of the lithium transition metal composite oxide, the electrolyte, and/or the like in a high temperature environment, and the decomposition proceed in the vicinity of the surfaces of the composite particles. However, it is not necessary that the spinel phase coat the whole surfaces of the composite particles. The spinel phase can sufficiently express the function even when the spinel phase is scattered in the vicinity of the surfaces of the composite particles.

The lithium transition metal composite oxide mainly include nickel (Ni) or cobalt (Co) and also includes at least one element X1. Here, what is meant by "mainly include nickel (Ni) or cobalt (Co)" is an atom ratio of nickel or cobalt in the sum of metal elements included in the lithium transition metal composite oxide is 50% or more. The element X1 functions on the surfaces of the composite particles, and therefore, it is preferable that a concentration of the element X1 be higher on the surface than inside of the composite particles.

The lithium transition metal composite oxide is capable of intercalation and deintercalation of lithium serving as an electrode reactive material. Preferable examples of the lithium transition metal composite oxide include (a) a composite oxide equivalent to lithium nickel oxide whose nickel is substituted with at least one element X1, (b) a composite oxide equivalent to lithium nickel oxide whose nickel is substituted with at least one element X1 and at least one element XA, (c) a composite oxide equivalent to lithium cobalt oxide whose cobalt is substituted with at least one element X1, and (d) a composite oxide equivalent to lithium cobalt oxide whose cobalt is substituted with at least one element X1 and at least one element XB, because these configurations have a high replenishing property and a high discharging voltage. Here, the at least one element XA is at least one element selected from the group consisting of cobalt (Co), boron (B), vanadium (V), chrome (Cr), iron (Fe), copper (Cu), zinc (Zn), tin (Sn), calcium (Ca) and strontium (Sr). Moreover, the at least one element XB is at least one element selected from the group consisting of nickel (Ni), boron (B), vanadium (V), chrome (Cr), iron (Fe), copper (Cu), zinc (Zn), tin (Sn), calcium (Ca) and strontium (Sr).

As a lithium transition metal composite oxide having a lamellar rock-salt structure and mainly including nickel, one having an average composition represented by the following formula (2) is preferable:

$$Li_mNi_{(1-n)}M2_nO_{(2-p)}F_q \quad (2)$$ 

(where M2 is at least one element X1, and m, n, p, and q are values within such ranges that $0.8 \leq m \leq 1.2$, $0.005 \leq n \leq 0.5$, $-0.1 \leq p \leq 0.2$, and $0 \leq q \leq 0.1$, where a lithium composition varies depending on a charging and discharging state, and m indicates a value in a full discharging state.)

It should be noted that in addition to at least one element X1, M2 may further include at least one element selected from the group consisting of cobalt (Co), boron (B), vanadium (V), chrome (Cr), iron (Fe), copper (Cu), zinc (Zn), tin (Sn), calcium (Ca) and strontium (Sr).

As a lithium transition metal composite oxide having a lamellar rock-salt structure and mainly including cobalt, one having an average composition represented by the following formula (3) is preferable:

$$Li_rCO_{(1-s)}M3_sO_{(2-t)}F_u \quad (3)$$ 

(where M3 is at least one element X1, and r, s, t, and u are values within such ranges that $0.8 \leq r \leq 1.2$, $0 \leq s \leq 0.5$, $-0.1 \leq t \leq 0.2$, and $0 \leq u \leq 0.1$, where a lithium composition varies depending on a charging and discharging state, and r indicates a value in a full discharging state.)

It should be noted that in addition to at least one element X1, M3 may further include at least one element selected from the group consisting of nickel (Ni), boron (B), vanadium (V), chrome (Cr), iron (Fe), copper (Cu), zinc (Zn), tin (Sn), calcium (Ca) and strontium (Sr).

It is preferable that the composite particle further compositely include a compound of at least one element X2 selected from the group consisting of sulfur (S), phosphorous (P), and fluorine (F). With the configuration in which the composite particles further compositely include such a compound of the element X2, it especially becomes possible to improve performance deterioration in long-term storage and long-term cycle property. In the present disclosure, what is meant by "further compositely include a compound of the element X2" is that the lithium transition metal composite oxide, the spinel phase, and the compound of the element X2 are integrated as one particle.

Because the compound of the element X2 functions outside the crystal system of the lithium transition metal composite oxide, it is preferable that the compound of the element X2 be eccentrically populated to be more abundant on either or both of the surfaces of the composite particles or/and the crystal grain boundary of the composite particles. However, the compound of the element X2 may exist in a portion of the composition particles other than the surface of the composite particles or the crystal grain boundary. The compound of the element X2 existing on the surfaces of the composite particles may be scattered on the surfaces of the composite particles or the compound of the element X2 may coat the surfaces of the composite particles. Here, the coating may partially coat the surfaces of the composite particles or may coat the whole surfaces of the composite particles.

It is preferable that powder of the composite particles include two or more kinds of particle powder having different average particle diameters and the two or more kinds of particle powder be different from each other in at least one of the content amount of the element X1 and the content ratio of the spinel phase within the composite particles. For the sake of improving the battery performance, it is more preferable that the two or more kinds of particle powder be different from each other in both of the content amount of the element X1 and the content ratio of the spinel phase within the composite particles. This is because the particle powder with the different average particle diameters has different contact areas with the electrolyte in the battery, whereby the effects of improving the cycle property and the storage property at a high temperature would be more eminently expressed when at least one of the content amount of the element X1 and the content ratio of the spinel phase within the composite particles varies depending on the average particle diameters of the particle powder.

More specifically, the two or more kinds of particle powder with a smaller average particle diameter has a greater value for at least one of the content amount of the element X1 and the content ratio of the spinel phase within the composite particles preferably. Particle powder with a smaller average particle powder has a greater specific surface area and therefore a greater reactive area, thereby being more apt to deterioration. Therefore, it is effective to configure such that particle powder with a smaller average particle diameter has a greater value for at least one of the content amount of the element X1 and the content ratio of the spinel phase as describe above.

It is preferable that powder of particles including an oxide including at least one element X1 be further provided and exist independently of the composite particles. With such powder of particles, it becomes possible to more effectively down-regulate the decomposition of the electrolyte. The particles may further include Li.

The positive electrode active material according to the first exemplary embodiment of the present disclosure can be produced, for example, by mixing a spinel compound having a cubic crystal phase, and if necessary, the compound including the element X2 into the lithium transition metal composite oxide including the element X1 or a raw material thereof, and subjecting it to heat treatment.

Moreover, the positive electrode active material according to the first exemplary embodiment of the present disclosure can be produced by adjusting synthesis conditions for producing the lithium transition metal composite oxide, or can be produced by coating particles with a predetermined element by mechanochemical treatment or by depositing the predetermined element on the particles by sputtering or a gas phase method such as Chemical Vapor Deposition (CVD). It should be noted that the production method of the positive electrode active material according to the first exemplary embodiment is not limited to these methods.

Moreover, to produce two or more kinds of particle power with different average particle diameters, it may be configured to produce mixture powder including two or more kinds of particle powder having different content amounts of the element X1 according to the average particle diameters by providing the two or more kinds of particle powder with the different adding amounts and mixing the two or more kinds of particle powder together later.

The positive electrode active material according to the first exemplary embodiment includes powder of composite particles compositely including the lithium transition metal composite oxide having the lamellar rock-salt structure and the spinel phase. The spinel phase includes an oxide including at least one element X1 selected from the group consisting of lithium, magnesium, aluminum, titanium, manganese, yttrium, zirconium, molybdenum, and tungsten. Moreover, the lithium transition metal composite oxide mainly include nickel or cobalt and includes at least one element X1. With this configuration, it becomes possible to improve the cycle property and storage property at a high temperature. Moreover, this configuration makes it possible to down-regulate the increase of the internal resistance.

With the positive electrode active material according to the first exemplary embodiment of the present disclosure, it is possible to produce a non-aqueous electrolyte battery such as lithium ion batteries of various shapes and sizes. In the following, one example of such a non-aqueous electrolyte battery including the positive electrode active material according to the first exemplary embodiment of the present disclosure will be described.

FIG. 1 illustrates one example of a configuration of a non-aqueous electrolyte battery according to a second exemplary embodiment of the present disclosure. This non-aqueous electrolyte battery may be, for example, a non-aqueous electrolyte secondary battery such as a lithium ion secondary battery. This non-aqueous electrolyte battery is of a so-called cylinder type, and includes a wound electrode assembly 20 in which strips of a positive electrode 21 and a negative electrode 22 are laminated with a separator 23 interposed therebetween and wound up inside a battery can 11 that has a substantially hollow cylindrical shape. The electrolyte solution is injected into the battery can 11 as an electrolyte in a liquid form, and is impregnated into the positive electrode 21, the negative electrode 22 and the separator 23.

The battery can 11 is constituted by, for example, nickel (Ni)-plated iron (Fe), and has one end portion closed and the other end portion opened. Inside the battery can 11, a pair of insulating plates 12 and 13 is provided perpendicularly with respect to a winding surface with the wound electrode assembly 20 interposed therebetween.

The opened end portion of the battery can 11 is provided with a battery lid 14, and a safety valve mechanism 15 and a heat sensitive resistor element (positive Temperature Coefficient; PTC element) 16 provided on an inner side of the battery lid 14, and the battery lid 14 with the safety valve mechanism 15 and the positive temperature coefficient element 16 are attached to the opened end portion by crimping via a sealing gasket 17, whereby the inside of the battery can 11 is sealed.

The battery lid 14 is configured, for example, of a material similar to that of the battery can 11.

The safety valve mechanism 15 is electrically connected to the battery lid 14 via the positive temperature coefficient element 16, and is configured such that, when an internal pressure of the battery reaches a certain level or higher due to internal short-circuit, external heating, or the like, the safety valve mechanism 15 cuts off electric connection between the battery lid 14 and the wound electrode assembly 20 by inverting a disc plate 15A.

The positive temperature coefficient element 16 is configured to increase its resistivity to impede the flow of electricity when a temperature increases, thereby preventing abnormal heat generation due to large current. The sealing gasket 17 is, for example, constituted with an insulating material and is coated with asphalt on a surface of the sealing gasket 17.

Through the center of the wound electrode assembly 20, for example, a center pin 24 is inserted. A positive electrode lead 25 made of aluminum (Al) or the like is connected to a positive electrode 21 of the wound electrode assembly 20, and a negative electrode lead 26 made of nickel (Ni) or the like is connected to a negative electrode 22. The positive electrode lead 25 is welded to the safety valve mechanism 15 to be electrically connected to the battery lid 14, and the negative electrode lead 26 is welded to the battery can 11 to be electrically connected thereto.

Figure 2:
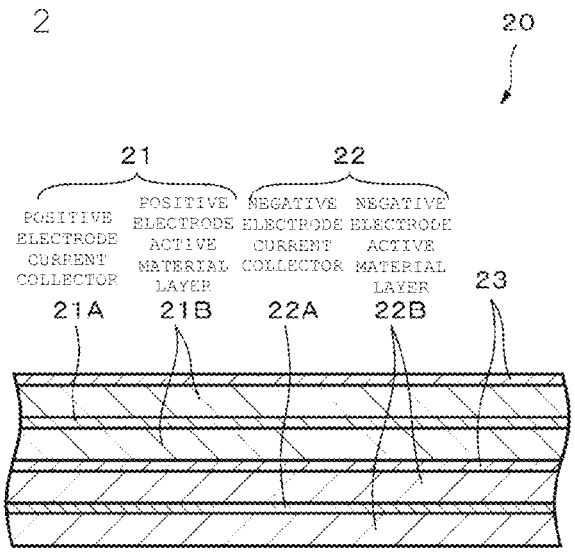
FIG. 2 is a cross-sectional view illustrating an enlarged part of a wound electrode assembly shown in FIG. 1.

The positive electrode 21 includes, as illustrated in FIG. 2, a positive electrode current collector 21A having a pair of surfaces opposite to each other, and a positive electrode active material layer 21B provided on each of the sides of the positive electrode current collector 21A. Note that the positive electrode 21 may have a region where the positive electrode active material layer 21B is provided on only one of the sides of the positive electrode current corrector 21A. The positive electrode current collector 21A is made of a metal foil, for example, an aluminum foil, a nickel foil, or a stainless steel foil.

The positive electrode active material layer 21B is constituted by including the positive electrode active material according to the first exemplary embodiment as described above. The positive electrode active material layer 21B may also include, for example, a conductive agent, and may further include a binder as well. Examples of the conductive agent include carbon materials such as graphite, carbon black, and Ketjen black, and one of them is used solely or two or more of them are mixed and used. In addition, any metal material or conductive polymer material that is a material having conductivity may be used in addition to the carbon material.

Examples of the binder include synthetic rubber such as styrene-butadiene-type rubber, fluorine-type rubber, or ethylene-propylenediene rubber, or a polymer material such as polyvinylidene fluoride, and one of them is used solely or two or more of them are mixed and used. For example, in a case where the positive electrode 21 and the negative electrode 22 are wound as illustrated in FIG. 1, it is preferable to use styrene-butadiene-type rubber, fluorine-type rubber, or the like with a good flexibility as the binder.

The negative electrode 22 includes, as illustrated in FIG. 2, a negative electrode current collector 22A having a pair of surfaces opposite to each other, and a negative electrode active material layer 22B provided on each of the sides of the negative electrode current collector 22A. Note that the negative electrode 22 may have a region where the negative electrode active material layer 22B is provided on only one of the sides of the negative electrode current collector 22A.

The negative electrode current collector 22A includes a metal foil such as a copper foil, a nickel foil, or a stainless steel foil, which is excellent in electrochemical stability, electric conductivity, and mechanical strength. Especially, the copper foil is the most preferable because the copper foil has a high electric conductivity.

The negative electrode active material layer 22B includes, as the negative electrode active material, any one or any two or more of negative electrode material capable of intercalation and deintercalation of lithium (Li), and may further include, for example, a binder similar to that for the positive electrode active material layer 21B, if necessary.

As the negative electrode material, any material capable of electrochemically doping and undoping lithium at a potential of 2.0 V or less with respect to a lithium metal can be used.

Examples of the carbon materials used as the negative electrode material include hardly graphitizable carbon, artificial graphite, natural graphite, thermally decomposed carbons, cokes (such as pitch coke, needle coke, and petroleum coke), graphites, glass-like carbons, fired organic polymer compound materials (materials such as phenol resin and furan resin carbonized by firing at an appropriate temperature), carbon fibers, activated carbon, carbon blacks, and the like. Moreover, metals alloyable with lithium and alloys and intermetallic compounds thereof are also usable. Oxides capable of doping and undoping lithium with relatively poor potentials such as iron oxide, ruthenium oxide, molybdenum oxide, tungsten oxide, titanium oxide, and tin oxide are usable, and other nitrides, etc. are usable. The negative electrode is not particularly limited in terms of its form as well, and may be one formed by applying active material powder, or one formed by forming the negative electrode active material layer 22B on the negative electrode current collector 22A by vapor deposition or the like.

The electrolyte is a so-called non-aqueous electrolyte solution, and includes an organic solvent (non-aqueous solvent) and electrolyte salt dissolved in the organic solvent. In order to improve a battery characteristic, the electrolysis solution may include a known additive.

Examples of the organic solvent include propylene carbonate, ethylene carbonate, diethyl carbonate, dimethyl carbonate, 1,2-dimethoxyethane, 1,2-diethoxyethane, vinylene carbonate, γ-butyrolactone, tetrahydrofurane, 2-methyl tetrahydrofurane, 1,3-dioxolan, 4-methyl-1,3-dioxolan, diethylether, sulfolane, methyl sulfolane, acetonitrile, propionitrile, anisole, acetic ester, lactic ester, propionic ester, and the like.

As the electrolyte salt, any one usable for this kind of battery can be usable. Examples of such an electrolyte salt include $LiClO_4$, $LiAsF_6$, $LiPF_6$, $LiBF_4$, $LiB(C_6H_5)_4$, $CH_3SO_3Li$, $CF_3SO_3Li$, LiCl, LiBr, and the like.

The separator 23 may be, for example, porous film made from a synthetic resin such as polytetrafluoroethylene, polypropylene, or polyethylene, or a porous film made from a ceramic. Moreover, the separator 23 may be one having a structure in which two or more kinds of these porous films are laminated. Among them, polyolefin-type porous films such as polyethylene and polypropylene are preferable because such polyolefin-type porous films are excellent in preventing short-circuiting and capable of providing a shutdown effect, thereby improving the safety of the battery. Moreover, the separator 23 may be one in which a porous resin layer of polyvinylidene fluoride, polytetrafluoroethylene, or the like is formed on a microporous film of a polyolefin or the like.

This non-aqueous electrolyte battery is capable of expressing a high performance with a charging and discharging voltage similar to that of a conventional lithium ion secondary battery, but can attain a much higher energy density with an upper limit of the charging voltage not less than 4.25 V but not more than 4.80 V, which is higher than that of the conventional non-aqueous electrolyte battery. It is more preferable that the upper limit of the charging voltage be not less than 4.35 V but not more than 4.65 V, and it is preferable that a lower limit of the charging voltage be not less than 2.00 V but not more than 3.30 V.

In the battery having the above-described configuration, when charging is performed, for example, lithium ions are deintercalated from the positive electrode active material layer 21B, and intercalated into the negative electrode active material layer 22B through the electrolysis solution. In addition, when discharging is performed, for example, lithium ions are deintercalated from the negative electrode active material layer 22B and intercalated into the positive electrode active material layer 21B through the electrolysis solution.

Next, one example of a production method of the non-aqueous electrolyte battery according to the second exemplary embodiment of the present disclosure will be described. First, for example, a positive electrode compound is prepared by mixing the positive electrode active material, a conductive agent, and a binder, and a paste-form positive electrode compound slurry is produced by dispersing the positive electrode compound into a solvent such as N-methyl-2-pyrrolidinone (NMP). Next, the positive electrode compound slurry is applied on the positive electrode current collector 21A, the solvent is dried, and the dried mixture is compression molded with a rolling press machine or the like, so that the positive electrode active material layer 21B is formed. Thereby, the positive electrode 21 is obtained.

Further, for example, a negative electrode mixture is produced by mixing a negative electrode active material and a binder, and a paste-form negative electrode mixture slurry is prepared by dispersing this negative electrode mixture in a solvent such as N-methyl-2-pyrrolidone (NMP). Next, the negative electrode mixture slurry is applied on the negative electrode current collector 22A, the solvent is dried, and the dried mixture is compression molded with a rolling press machine or the like, so that the negative electrode active material layer 22B is formed. Thereby, the negative electrode 22 is obtained.

Next, the positive electrode lead 25 is attached to the positive electrode current collector 21A by welding or the like, and the negative electrode lead 26 is attached to the negative electrode current collector 22A by welding or the like. After that, the positive electrode 21 and the negative electrode 22 are wound via the separator 23, the tip part of the positive electrode lead 25 is welded to the safety valve mechanism 15, the tip part of the negative electrode lead 26 is welded to the battery can 11, and the wound positive electrode 21 and negative electrode 22 are interposed between the pair of insulator plates 12 and 13 and are contained inside the battery can 11. After the positive electrode 21 and the negative electrode 22 are contained inside the battery can 11, the electrolysis solution is injected into the battery can 11 to impregnate the separator 23. After that, the battery lid 14, the safety valve mechanism 15 and the positive temperature coefficient element 16 are fixed to the opening end part of the battery can 11 by crimping via the opening sealing gasket 17. In this way, a non-aqueous electrolyte battery as illustrated in FIG. 1 is obtained.

Figure 3:
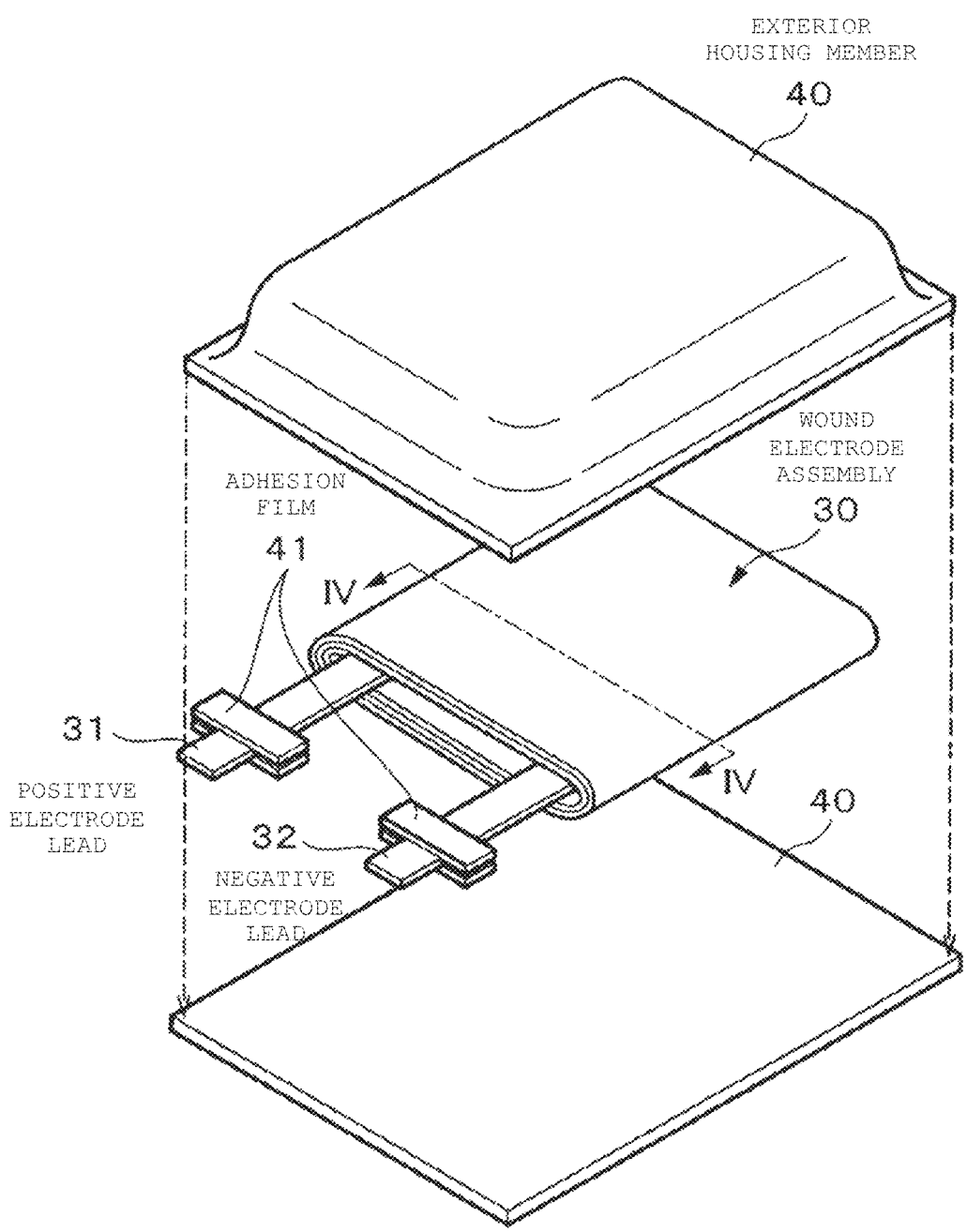
FIG. 3 is an exploded perspective view illustrating an example of a configuration of a non-aqueous electrolyte battery according to an embodiment of the present disclosure.

FIG. 3 illustrates one example of a configuration of a non-aqueous electrolyte battery according to a third exemplary embodiment of the present disclosure. This non-aqueous electrolyte battery is configured such that a wound electrode assembly 30 with a positive electrode lead 31 and a negative electrode lead 32 attached thereto is accommodated inside an exterior housing member 40 of a film shape, thereby being capable of attaining miniaturization, light weight, and thin thickness.

Each of the positive electrode lead 31 and the negative electrode lead 32 is led out from the inside of the exterior housing member 40 toward the outside in the same direction, for example. The positive electrode lead 31 and the negative electrode lead 32 are each formed using, for example, a metal material such as aluminum (Al), copper (Cu), nickel (Ni), or stainless steel (SUS), in a thin plate state or a network state.

Each of the exterior housing members 40 is configured, for example, of a rectangular aluminum laminate film obtained by pasting a nylon film, an aluminum foil and a polyethylene film in this order. Each of the exterior housing members 40 is disposed, for example, such that the polyethylene film side thereof faces the wound electrode assembly 30, and their outer edge parts adhere to each other by fusion or with an adhesive. Adhesion films 41 are inserted between the exterior housing members 40 and the positive electrode lead 31 and negative electrode lead 32 to prevent intrusion of the air. The adhesion film 41 is configured of a material having adherence with respect to the positive electrode lead 31 and the negative electrode lead 32, which material is, for example, polyolefin resin such as polyethylene, polypropylene, modified polyethelene and modified polypropylene. Note that the exterior housing member 40 may also be formed using a laminated film having another lamination structure, or a polymer film such as polypropylene or a metal film, instead of the above-described aluminum laminated film.

Figure 4:
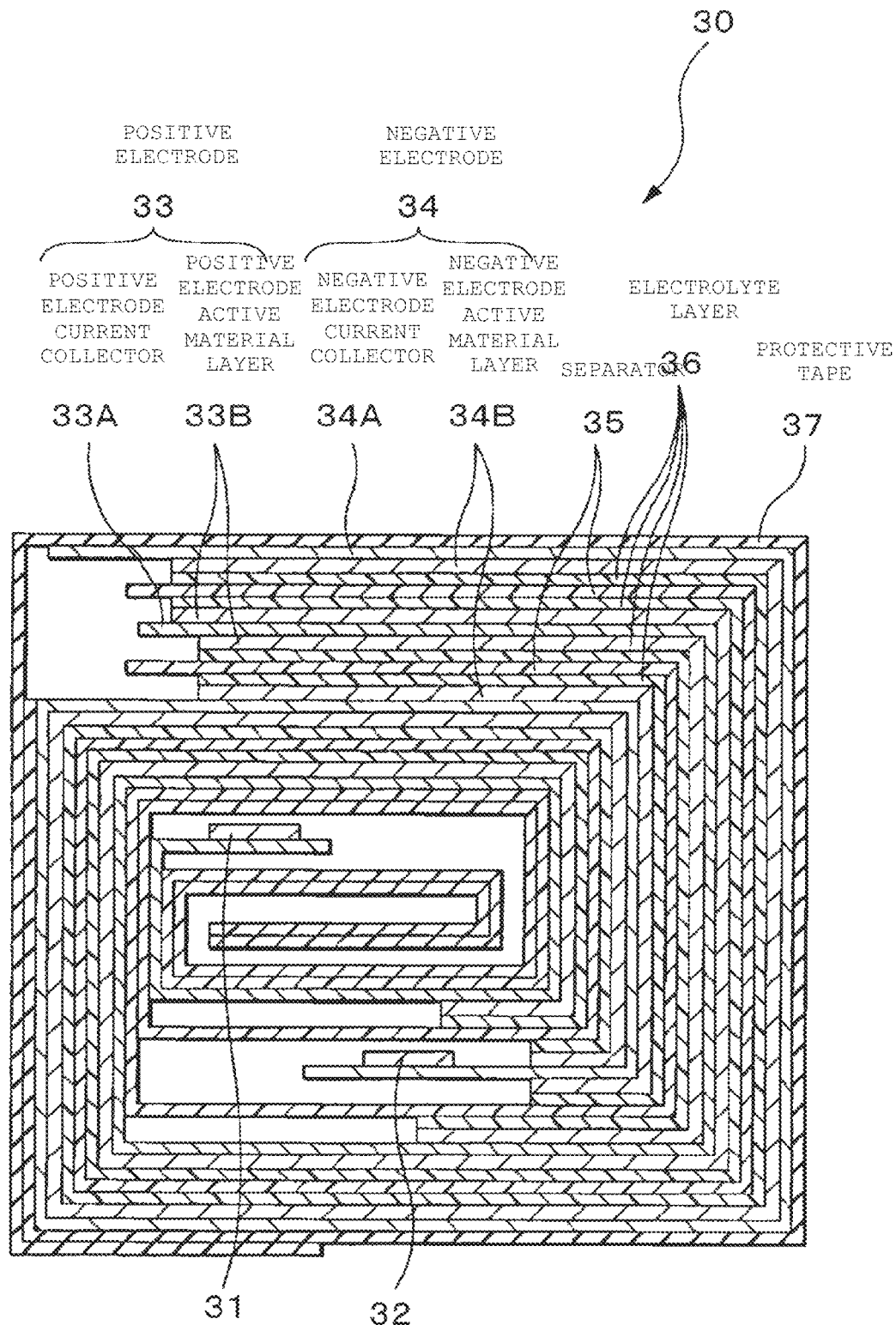
FIG. 4 is a cross-sectional view taken along IV-IV line in FIG. 3.

FIG. 4 illustrates a cross-sectional view along IV-IV line of the wound electrode assembly 30 shown in FIG. 3. This wound electrode assembly 30 is prepared by laminating a positive electrode 33 and a negative electrode 34 with a separator 35 and an electrolyte layer 36 interposed therebetween and winding the laminate, and an outermost peripheral portion thereof is protected by a protective tape 37.

The positive electrode 33 has a structure in which positive electrode active material layers 33B are provided on one side or both sides of the positive electrode current collector 33A. The negative electrode 34 has a structure in which negative electrode active material layers 34B are provided on one side or both sides of the negative electrode current collector 34A, and the negative electrode active material layer 34B is disposed so as to face the positive electrode active material layer 33B. The configurations of the positive electrode current collector 33A, the positive electrode active material layer 33B, the negative electrode current collector 34A, the negative electrode active material layer 34B and the separator 35 are similar to those of the positive electrode current collector 21A, the positive electrode active material layer 21B, the negative electrode current collector 22A, the negative electrode active material layer 23B and the separator 23 described in the second exemplary embodiment, respectively.

The electrolyte layer 36 contains an electrolysis solution and a polymer compound which is a retention body retaining the electrolysis solution, and is in a so-called gel form. The electrolyte layer 36 of a gel form is preferable, because the electrolyte layer 36 is capable of attaining a high ion conductivity and preventing liquid leakage of the battery. The polymer compound may be various polymer compounds that can gelatinize by absorbing the electrolyte solution therein. Examples of usable polymer compounds include fluoride-type polymers such as poly(vinylidene fluoride), and poly(vinylidene fluoride-co-hexafluoropropylene), ether-type polymer such as poly(ethylene oxide) and cross-linked poly(ethylene oxide), polyacrylonitrile, and the like. Especially, for the sake of oxidation and reduction stability, it is preferable to use a fluoride-type polymer. Note that it may be configured to use an electrolyte solution instead of the electrolyte layer 36.

Next, one example of a production method of the non-aqueous electrolyte battery according to the third exemplary embodiment of the present disclosure will be described. To begin with, a precursor solution is applied to each of a positive electrode 33 and a negative electrode 34, the precursor solution including a solvent, an electrolyte salt, a polymer compound, and a mixed solvent, and the mixed solvent is volatilized to form an electrolyte layer 36 of a gel form. After that, a positive lead 31 is welded to an end portion of a positive electrode assembly 33A and a negative electrode lead 32 is welded to an end portion of a negative electrode assembly 34A.

Next, the electrode 33 and the negative electrode 34, on each of which the electrolyte layer 36 of the gel form is formed, are laminated with a separator 35 interposed therebetween, thereby forming a laminate, and the laminate is wound in a longitudinal direction thereof, and a protective tape 37 is adhered around an outermost peripheral portion, thereby forming a wound electrode assembly 30.

Finally, for example, the wound electrode assembly 30 is sandwiched between exterior housing members 40 and outer edge parts of the exterior housing members 40 are adhered to each other by thermal fusion or the like, thereby sealing the wound electrode assembly 30 therein. On that occasion, the adhesion film 41 is inserted between each of the positive electrode lead 31 and the negative electrode lead 32, and the exterior housing member 40. In this way, a non-aqueous electrolyte battery as illustrated in FIGS. 3 and 4 is obtained.

Alternatively, the non-aqueous electrolyte battery may be produced as follows. First of all, in the above-described manner, the positive electrode 33 and the negative electrode 34 are produced, and the positive electrode lead 31 and the negative electrode lead 32 are attached to the positive electrode 33 and the negative electrode 34, respectively. After that, the positive electrode 33 and the negative electrode 34 are laminated with the separator 35 interposed therebetween, the laminate is wound, and the protective tape 37 is adhered to an outermost peripheral portion, thereby forming a wound body that is a precursor of the wound electrode assembly 30. Next, the wound body is interposed between the exterior housing members 40, the outer peripheral edge portions except for one side are adhered to each other by heat fusion to make a bag form, and the wound electrode assembly 30 is housed in the inside of the exterior housing member 40. Next, an electrolyte composite including, a solvent, an electrolyte salt, a monomer which is a raw material of a polymer compound, a polymerization initiator, and another material such as a polymerization inhibitor as necessary is prepared and injected into the exterior housing member 40.

The opening part of the exterior housing member 40 undergoes thermal fusion under a vacuum atmosphere to be sealed after the electrolyte composite is injected into the exterior housing member 40. Next, the monomer is polymerized by heating to be a polymer compound, to form the gel-form electrolyte layer 36. As above, a non-aqueous electrolyte battery as illustrated in FIGS. 3 and 4 is obtained.

"Battery Pack and Electronic Device as Application Examples"

Application Example 1 describes a battery pack and an electronic device including a battery according to the second or third exemplary embodiment.

Figure 5:
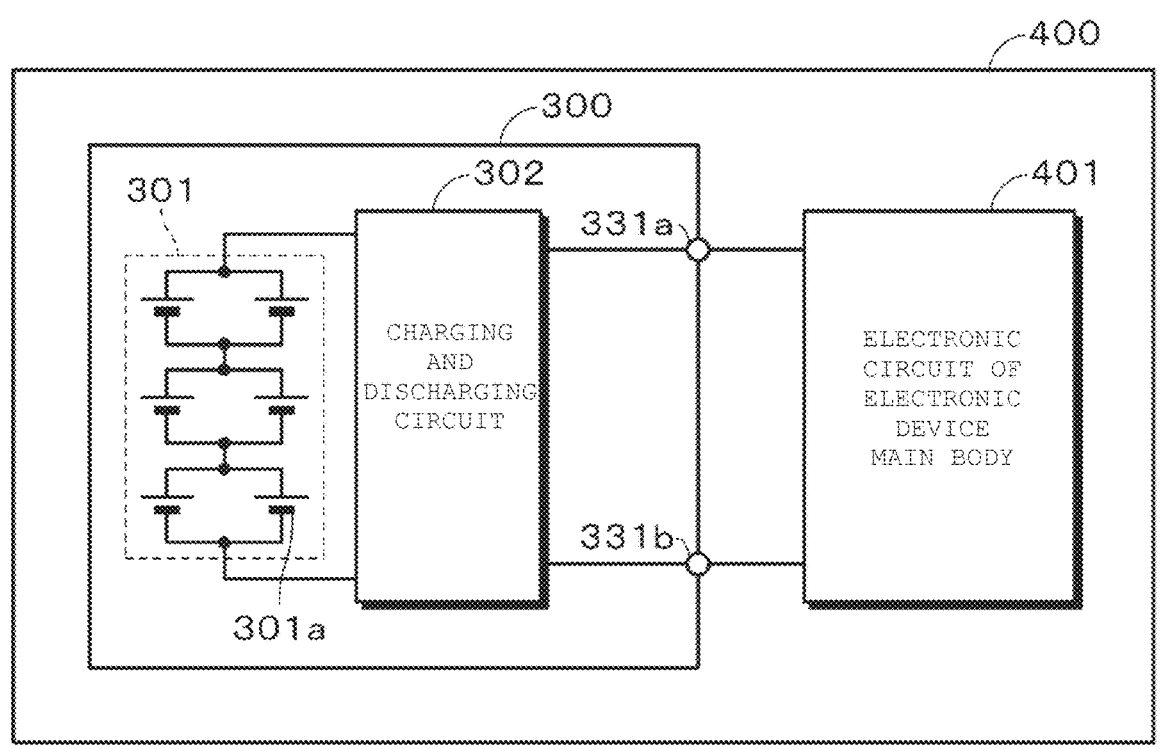
FIG. 5 is a block diagram illustrating an example of a configuration of an electronic device as one application example according to an embodiment of the present disclosure.

A configuration example of a battery pack 300 and an electronic device 400 as an application example will be described below with reference to FIG. 5. The electronic device 400 includes an electronic circuit 401 of an electronic device main body and the battery pack 300. The battery pack 300 is electrically connected to the electronic circuit 401 with a positive electrode terminal 331a and a negative electrode terminal 331b interposed therebetween. The electronic device 400 has, for example, a configuration in which the battery pack 300 is detachable by a user. However, the configuration of the electronic device 400 is not limited thereto, and a configuration in which the battery pack 300 is built in the electronic device 400 so that the user is unable to remove the battery pack 300 from the electronic device 400 may be used.

When the battery pack 300 is charged, the positive electrode terminal 331a and the negative electrode terminal 331b of the battery pack 300 are connected to a positive electrode terminal and a negative electrode terminal of a charger (not shown), respectively. On the other hand, when the battery pack 300 is discharged (when the electronic device 400 is used), the positive electrode terminal 331a and the negative electrode terminal 331b of the battery pack 300 are connected to a positive electrode terminal and a negative electrode terminal of the electronic circuit 401, respectively.

Examples of the electronic device 400 include a notebook personal computer, a tablet computer, a mobile phone (for example, a smartphone), a personal digital assistant (PDA), a display device (for example, an LCD, an EL display, an electronic paper), an imaging device (for example, a digital still camera and a digital video camera), an audio device (for example, a portable audio player), a game device, a cordless phone extension unit, an E-book, an electronic dictionary, a radio, a headphone, a navigation system, a memory card, a pacemaker, a hearing aid, an electric tool, an electric shaver, a refrigerator, an air conditioner, a TV, a stereo, a water heater, a microwave, a dishwasher, a washing machine, a dryer, a lighting device, a toy, a medical device, a robot, a load conditioner, and a traffic light, and the present technology is not limited thereto.

The electronic circuit 401 includes, for example, a CPU, a peripheral logic unit, an interface unit, and a storage unit, and controls the entire electronic device 400.

The battery pack 300 includes an assembled battery 301 and a charging and discharging circuit 302. The assembled battery 301 includes a plurality of secondary batteries 301a that are connected in series and/or parallel. The plurality of secondary batteries 301a are connected, for example, in n parallel m series (n and m are positive integers). In addition, FIG. 5 shows an example in which six secondary batteries 301a are connected in 2 parallel 3 series (2P3S). As the secondary battery 301a, the battery according to the second or third exemplary embodiment is used.

Here, a case where the battery pack 300 includes an assembled battery 301 including a plurality of secondary batteries 301a will be described. However, the battery pack 300 may include a single secondary battery 301a instead of the assembled battery 301.

The charging and discharging circuit 302 is a control unit (controller) configured to control charging and discharging of the assembled battery 301. More specifically, when charging, the charging and discharging circuit 302 controls the charging of the assembled battery 301. On the other hand, when discharging (that is, when the electronic device 400 is in use), the charging and discharging circuit 302 controls the discharging to the electronic device 400.

"Power Storage System in Vehicle as Application Example"

Figure 6:
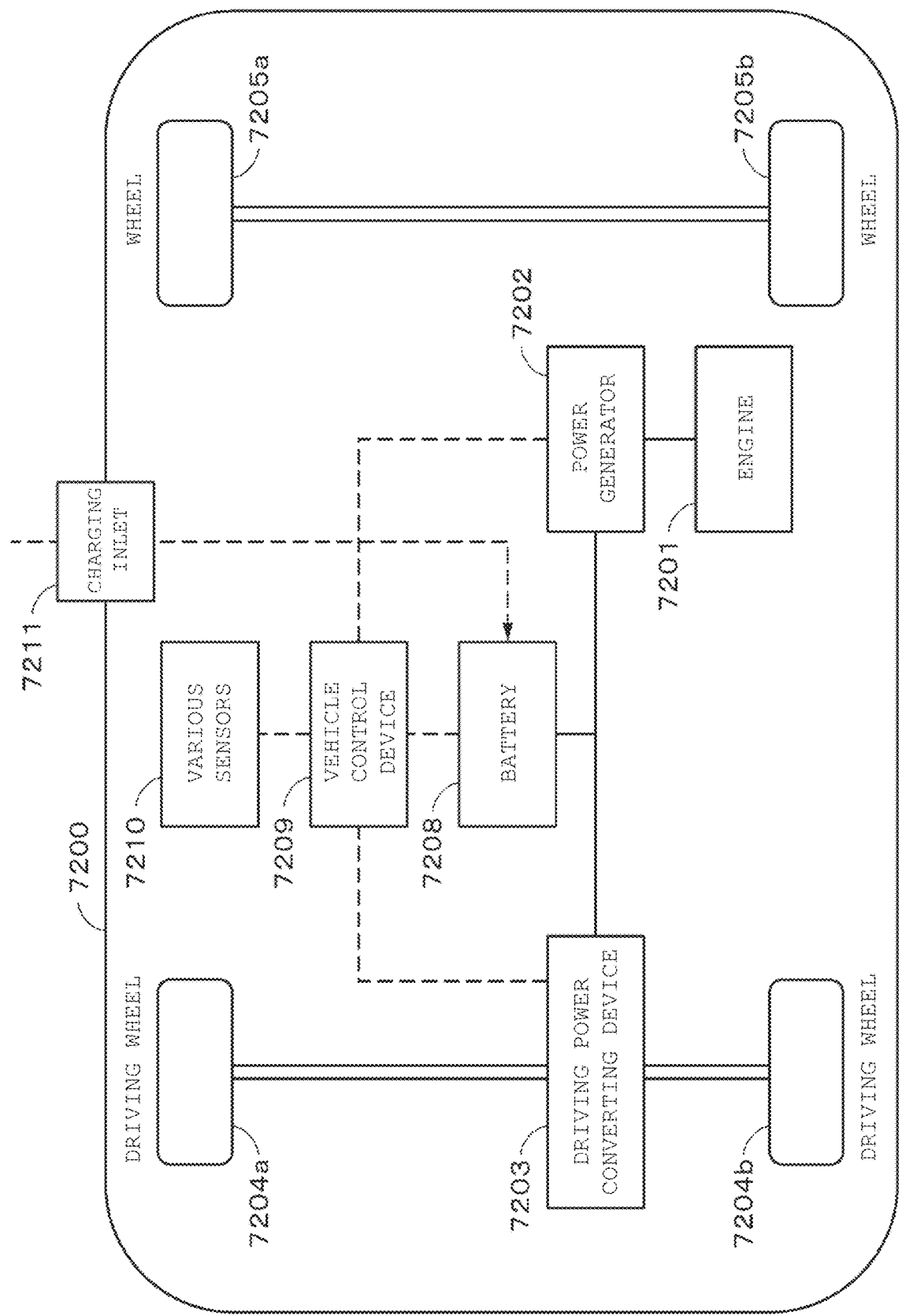
FIG. 6 is a schematic view illustrating an example of a configuration of a vehicle as one application example according to an embodiment of the present disclosure.

A case where the present disclosure is applied in a power storage system for a vehicle will be described with reference to FIG. 6. FIG. 6 schematically illustrates one example of a configuration of a hybrid vehicle in which a series hybrid system to which the present disclosure is applied is adopted. The series hybrid system is a vehicle that uses power generated by a power generator that is moved by an engine or power that is generated by a power generator and stored temporarily in a battery and is operated by a driving power converting device.

A hybrid vehicle 7200 incorporates an engine 7201, a power generator 7202, the driving power converting device 7203, driving wheels 7204a and 7204b, wheels 7205a and 7205b, a battery 7208, a vehicle control device 7209, various sensors 7210, and a charging inlet 7211. For the battery 7208, the power storage device according to the present disclosure described above is applied.

The hybrid vehicle 7200 runs by using the driving power converting device (converter) 7203 as a power source. One example of the driving power converting device 7203 is a motor. Power in the battery 7208 drives the driving power converting device 7203, and the rotating power of the driving power converting device 7203 is transmitted to the driving wheels 7204a and 7204b. It should be understood that by using DC/AC conversion or AC/DC conversion in a necessary portion, an alternate current motor or a direct current motor can be used for the driving power converting device 7203. The various sensors 7210 control the number of engine rotation via the vehicle control device 7209 and controls the aperture (throttle aperture) of a throttle valve not shown. The various sensors 7210 include a speed sensor, an acceleration sensor, a sensor of the number of engine rotation, and the like.

The rotating power of the engine 7201 is transmitted to the power generator 7202, and power generated by the power generator 7202 with the rotating power can be accumulated in the battery 7208.

When the hybrid vehicle reduces the speed with a brake mechanism not shown, the resisting power at the time of the speed reduction is added to the driving power converting device 7203 as the rotating power, and regenerative power generated by the driving power converting device 7203 with this rotating power is accumulated in the battery 7208.

The battery 7208 is connected to a power source outside the hybrid vehicle, receives power supply from the external power source using the charging inlet 211 as an input port, and can accumulate the received power.

Although not shown, an information processing device which performs information processing about vehicle control based on information about the secondary battery may be provided. Examples of such an information processing device include an information processing device which displays the remaining battery based on information about the remaining battery.

It should be understood that the above description is made by taking an example of the series hybrid car which runs with a motor using power generated by a power generator driven by an engine or the power accumulated in a battery. However, an embodiment of the present disclosure can also be applied effectively to a parallel hybrid car which uses the output of an engine and a motor as the driving power source and switches three modes as appropriate: driving with the engine only; driving with the motor only; and driving with the engine and the motor. Further, an embodiment of the present disclosure can also be applied effectively to a so-called electric vehicle which runs by being driven with a driving motor only, without an engine.

So far, one example of the hybrid vehicle 7200 to which the technique according to the present disclosure is applicable has been described. The technique according to the present disclosure is suitably applicable in the battery 7208 within the configuration described above.

Figure 7:
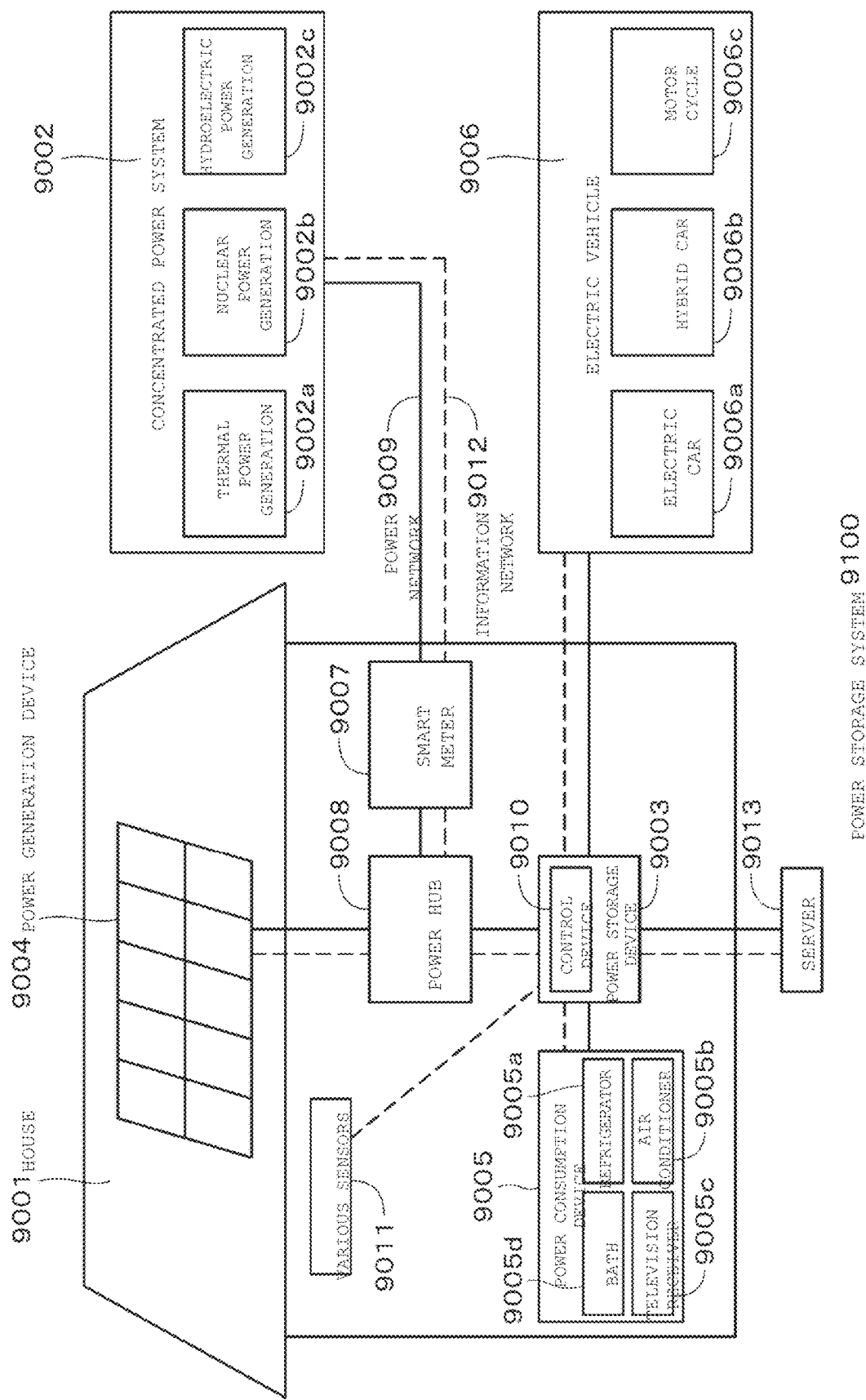
FIG. 7 is a schematic view illustrating an example of a configuration of a power storage system as one application example according to an embodiment of the present disclosure.

"Power Storage System in House as Application Example" An example in which the present disclosure is applied in a power storage system for a residential premise will be described with reference to FIG. 7. For example, in the power storage system 9100 for the house 9001, power is supplied to the power storage device 9003 from a concentrated power system 9002 including thermal power generation 9002a, nuclear power generation 9002b, hydroelectric power generation 9002c, and the like, via a power network 9009, an information network 9012, a smart meter 9007, a power hub 9008, and the like.

Further, power is supplied to the power storage device 9003 from an independent power source such as a home power generation device 9004. Power supplied to the power storage device 9003 is accumulated. Power to be used in the house 9001 is fed with use of the power storage device 9003. The same power storage system can be used not only in the house 9001 but also in a building.

The house 9001 is provided with the power generation device 9004, a power consumption device 9005, the power storage device 9003, a control device (controller) 9010 which controls each device, the smart meter 9007, and sensors 9011 which acquires various pieces of information. The devices are connected to each other by the power network 9009 and the information network 9012. As the power generation device 9004, a solar cell, a fuel cell, or the like is used, and generated power is supplied to the power consumption device 9005 and/or the power storage device 9003. Examples of the power consumption device 9005 include a refrigerator 9005a, an air conditioner 9005b, a television receiver 9005c, a bath 9005d, and the like. Examples of the power consumption device 9005 further include an electric vehicle 9006. The electric vehicle 9006 includes an electric car 9006a, a hybrid car 9006b, or a motorcycle 9006c.

The battery unit according to the present disclosure described above is applied to a power storage device 9003. The power storage device 9003 includes a secondary battery or a capacitor.

For example, it is constituted by a lithium ion battery. The lithium ion battery may be a stationary type or be for use in the electric vehicle 9006. A smart meter 9007 has functions to measure a used amount of a commercial power and transmit the measured amount to an electric power company. A power network 9009 may be for any one of direct current power feeding, alternative current power feeding, or wireless charging, or for a combination of two or more of them.

Examples of the various sensors 9011 include a motion sensor, an illumination sensor, an object detecting sensor, a power consumption sensor, a vibration sensor, a touch sensor, a temperature sensor, an infrared sensor, and the like. Information acquired by the various sensors 9011 is transmitted to the control device 9010. With the information from the sensors 9011, weather conditions, people conditions, and the like are caught, and the power consumption device 9005 is automatically controlled so as to make the energy consumption minimum. Further, the control device 9010 can transmit information about the house 9001 to an external power company via the Internet, for example.

The power hub 9008 performs processes such as branching off power lines and DC/AC conversion. Examples of communication schemes of the information network 9012 connected to the control device 9010 include a method using a communication interface such as UART (Universal Asynchronous Receiver/Transmitter), and a method using a sensor network according to a wireless communication standard such as Bluetooth (registered trademark), ZigBee, or Wi-Fi. A Bluetooth scheme can be used for multimedia communication, and one-to-many connection communication can be performed. ZigBee uses a physical layer of IEEE (Institute of Electrical and Electronics Engineers) 802.15.4. IEEE802.15.4 is the name of a near-field wireless network standard called PAN (Personal Area Network) or W (Wireless) PAN.

The control device 9010 is connected to an external server 9013. The server 9013 may be managed by any of the house 9001, an electric company, and a service provider. Examples of information transmitted and received by the server 9013 include, for example, power consumption information, life pattern information, electric fee, weather information, natural disaster information, and information about power trade. Such information may be transmitted and received by the power consumption device (e.g., the television receiver) in the house, or may be transmitted and received by a device (e.g., a mobile phone) outside the house. Further, such information may be displayed on a device having a display function, such as the television receiver, the mobile phone, or the Personal Digital Assistant (PDA).

The control device 9010 controlling each part is configured with a CPU (Central Processing Unit) or processor, a RAM (Random Access Memory), a ROM (Read Only Memory), and the like, and is stored in the power storage device 9003 in this example. The control device 9010 is connected to the power storage device 9003, the home power generation device 9004, the power consumption device 9005, the various sensors 9011, and the server 9013 via the information network 9012, and has a function of adjusting the used amount of commercial power and the power generation amount, for example. Note that the control device 9010 may further have a function of performing power trade in the power market.

As described above, power generated by not only the concentrated power system 9002 such as the thermal power 9002a, the nuclear power 9002b, and the hydroelectric power 9002c, but also the home power generation device 9004 (solar power generation or wind power generation) can be accumulated in the power storage device 9003.

Therefore, even when the power generated by the home power generation device 9004 varies, the amount of power supplied to the outside can be made constant, or only necessary discharge can be controlled. For example, power generated by the solar power generation can be accumulated in the power storage device 9003 and also inexpensive power at midnight can be accumulated in the power storage device 9003 during nighttime, so that power accumulated in the power storage device 9003 can be discharged and used during daytime when the power fee is expensive.

It should be understood that although this example shows the control device 9010 housed inside the power storage device 9003, the control device 9010 may be housed inside the smart meter 9007 or configured independently. Further, the power storage system 9100 may be used for a plurality of families in a multiple dwelling house or a plurality of separate houses.

So far, one example of the power storage system 9100 to which the technique according to the present disclosure is applicable has been described. The technique according to the present disclosure is suitably applicable to the secondary battery of the power storage device 9003 within the configuration described above.

EXAMPLES

In the following, the present disclosure will be concretely described referring to Examples, but the present disclosure is not limited to these Examples.

Example 1

A positive electrode active material was prepared as below. To begin with, by coprecipitation method, a nickel cobalt hydroxide was prepared, in which a mass ratio of nickel and cobalt was Ni:Co=8:2. Next, after lithium hydroxide was mixed into this nickel cobalt hydroxide, a resultant was fired at 750° C. for 10 hours in an oxygen flow, thereby obtaining lithium nickel cobaltate powder. Next, using the powder as a base material, 99 mol % of the base material and 1 mol % of magnesium oxide powder were mixed and treated with a high-speed stirring device, thereby obtaining lithium nickel cobaltate powder with magnesium distributed on surfaces of the particles.

Apart from this, cobalt carbonate, lithium carbonate, and magnesium carbonate were mixed in such a way that a Co amount and a Li amount had a molar ratio (Co:Li) of 2:1 and the Co amount and an Mg amount had a molar ratio (Co:Mg) of 99:1. After that, a mixture thus prepared was fired at 800° C. for 3 hours in an air flow, and finely crushed by a ball mill, thereby synthesizing lithium magnesium-containing cobalt oxide fine powder. The fine powder thus prepared was analyzed by X-ray diffractometer (XRD) to confirm that the fine powder had a spinel phase.

Next, into the lithium nickel cobaltate powder thus prepared in advance, the lithium magnesium-containing cobalt oxide fine powder and lithium phosphate powder that had been prepared separately by fine crushing were mixed together. The mixing amount was adjusted such that a concentration of the lithium magnesium-containing cobalt oxide fine powder would be 500 ppm and a concentration of the lithium phosphate powder was 400 ppm. Next, a mixture powder thus prepared was fired at 700° C. for 5 hours in an oxygen flow, thereby obtaining lithium transition metal composite oxide powder. The powder thus prepared was analyzed by transmission electron microscope (TEM), time-of-flight mass spectrometry (ToF-SIMS), and X-ray diffraction to confirm a state that the spinel phase and the lithium phosphate were eccentrically populated to be more abundant on the surfaces of the particles, and magnesium was contained in the lamellar rock-salt phase and the spinel phase and more concentrated on the surfaces of the particles.

Particle size distribution measurement found that 50% particle diameter D50 was 16 μm.

Figure 8:
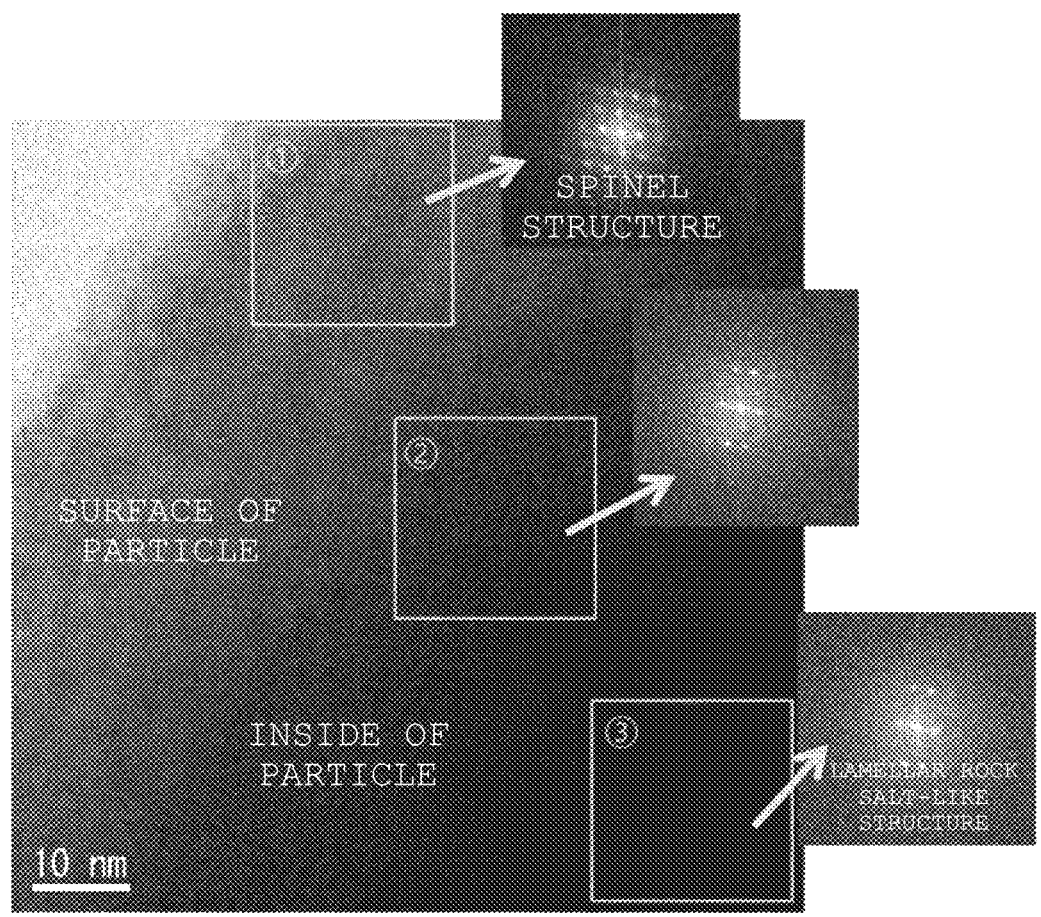
FIG. 8 is a transmission electron microscopy (TEM) image of a positive electrode active material prepared in Example 1 according to an embodiment of the present disclosure.

FIG. 8 illustrates a TEM image of the lithium transition metal composite oxide powder (positive electrode active material). Moreover, FIG. 8 also illustrates the X-ray diffraction patterns of the regions 1 to 3.

Using the lithium transition metal composite oxide powder thus prepared as the positive electrode active material, a positive electrode was prepared as below. To begin with, 90% by mass of the positive electrode active material, 6% by mass of graphite as a conductive agent, and 4% by mass of polyvinylidene fluoride (PVdF) as a binder were mixed together and dispersed in N-methyl-2-pyrrolidone (NMP), thereby preparing a positive electrode compound slurry. The slurry was applied evenly on both sides of an aluminum foil of a strip shape having a thickness of 20 μm, and dried. After that, the slurry was pressed by a roller pressing machine, thereby obtaining a positive electrode of a strip shape.

A negative electrode was prepared as below. To begin with, 90% by mass of artificial graphite of a powder form and 10% by mass of polyvinylidene fluoride (PVdF) were mixed together and dispersed in N-methyl-2-pyrrolidone (NMP), thereby forming a negative electrode compound slurry. The negative electrode mixed compound slurry was applied evenly on both sides of a copper foil having a thickness of 10 μm, and dried. After that, the slurry was pressed by a roller pressing machine, thereby obtaining a negative electrode of a strip shape.

The positive electrode of the strip shape and the negative electrode of the strip shape thus prepared were wound plural times with a porous polyolefin film interposed therebetween, thereby forming a wound electrode assembly. The electrode assembly was accommodated in a battery can made of iron and plated with nickel, and an insulating plate was placed on each of top and bottom surfaces of the electrode assembly. Next, a positive electrode lead made of aluminum was extended from the positive electrode current collector and welded to a protrusion section of a safety valve securely electrically connected with a battery lid, and a negative electrode lead made of nickel was extended from the negative electrode current collector and welded to a bottom of the battery can.

Finally, an electrolyte solution was introduced into the battery can in which the electrode assembly as described above was incorporated. The electrolyte solution used as a solution prepared by dissolving, in a mixture solvent of ethylene carbonate and methyl ethyl carbonate mixed therein with a volume mixing ratio of 1:1, $LiPF_6$ and 0.5% succinonitrile in such a way that the concentration would be 1 mol/$dm^3$. After that, the battery can was crimped with an insulating sealing gasket, thereby fixing the safety valve, the PTC element, and the battery lid so as to obtain a non-aqueous electrolyte secondary battery of a cylinder type of 18 mm in outer diameter and 65 mm in height (hereinafter, this will be simply referred to as the "battery").

Example 2

Lithium transition metal composite oxide powder as a positive electrode active material was prepared as below. To begin with, cobalt oxide and lithium carbonate were fired at 950° C. for 6 hours in an air flow, thereby preparing lithium cobaltate powder. Lithium transition metal composite oxide powder was prepared as in Example 1 except that this powder was used as the base material, the lithium transition metal composite oxide powder being such that lithium phosphate was eccentrically populated to be more abundant in the spinel phase and on the surfaces of particles, magnesium was contained in the lamellar rock salt phase and the spinel phase and concentrated on the surfaces of the particles. A battery was prepared as in Example 1 except that this powder was used as the positive electrode active material.

Example 3

Lithium transition metal composite oxide powder was prepared as in Example 1 except that the preparation process of the positive electrode active material used aluminum hydroxide instead of magnesium oxide, the lithium transition metal composite oxide powder being such that lithium phosphate was eccentrically populated to be more abundant in the spinel phase and on the surfaces of particles, aluminum was contained in the lamellar rock-salt phase and the spinel phase and concentrated on the surfaces of the particles. A battery was prepared as in Example 1 except that this powder was used as the positive electrode active material.

Example 4

Lithium transition metal composite oxide powder was prepared as in Example 2 except that the preparation process of the positive electrode active material used aluminum hydroxide instead of magnesium oxide, the lithium transition metal composite oxide powder being such that lithium phosphate was eccentrically populated to be more abundant in the spinel phase and on the surfaces of particles, aluminum was contained in the lamellar rock-salt phase and the spinel phase and concentrated on the surfaces of the particles. A battery was prepared as in Example 1 except that this powder was used as the positive electrode active material.

Example 5

Lithium transition metal composite oxide powder was prepared as in Example 1 except that the preparation process of the positive electrode active material used titanium oxide instead of magnesium oxide, the lithium transition metal composite oxide powder being such that the spinel phase and lithium phosphate were eccentrically populated to be more abundant on the surfaces of particles, titanium was contained in the lamellar rock-salt phase and the spinel phase and concentrated on the surfaces of the particles.

A battery was prepared as in Example 1 except that this powder was used as the positive electrode active material.

Example 6

Lithium transition metal composite oxide powder was prepared as in Example 2 except that the preparation process of the positive electrode active material used titanium oxide instead of magnesium oxide, the lithium transition metal composite oxide powder being such that the spinel phase and lithium phosphate were eccentrically populated to be more abundant on the surfaces of particles, titanium was contained in the lamellar rock-salt phase and the spinel phase and concentrated on the surfaces of the particles.

A battery was prepared as in Example 1 except that this powder was used as the positive electrode active material.

Example 7

Lithium transition metal composite oxide powder was prepared as in Example 1 except that the preparation process of the positive electrode active material used manganese carbonate instead of magnesium oxide, the lithium transition metal composite oxide powder being such that the spinel phase and lithium phosphate were eccentrically populated to be more abundant on the surfaces of particles, manganese was contained in the lamellar rock-salt phase and the spinel phase and concentrated on the surfaces of the particles. A battery was prepared as in Example 1 except that this powder was used as the positive electrode active material.

Example 8

Lithium transition metal composite oxide powder was prepared as in Example 2 except that the preparation process of the positive electrode active material used manganese carbonate instead of magnesium oxide, the lithium transition metal composite oxide powder being such that the spinel phase and lithium phosphate were eccentrically populated to be more abundant on the surfaces of particles, manganese was contained in the lamellar rock-salt phase and the spinel phase and concentrated on the surfaces of the particles. A battery was prepared as in Example 1 except that this powder was used as the positive electrode active material.

Example 9

Lithium transition metal composite oxide powder was prepared as in Example 1 except that the preparation process of the positive electrode active material used yttrium oxide instead of magnesium oxide, the lithium transition metal composite oxide powder being such that the spinel phase and lithium phosphate were eccentrically populated to be more abundant on the surfaces of particles, yttrium was contained in the lamellar rock-salt phase and the spinel phase and concentrated on the surfaces of the particles. A battery was prepared as in Example 1 except that this powder was used as the positive electrode active material.

Example 10

Lithium transition metal composite oxide powder was prepared as in Example 1 except that the preparation process of the positive electrode active material used zirconium oxide instead of magnesium oxide, the lithium transition metal composite oxide powder being such that the spinel phase and lithium phosphate were eccentrically populated to be more abundant on the surfaces of particles, zirconium was contained in the lamellar rock-salt phase and the spinel phase and concentrated on the surfaces of the particles. A battery was prepared as in Example 1 except that this powder was used as the positive electrode active material.

Example 11

Lithium transition metal composite oxide powder was prepared as in Example 2 except that the preparation process of the positive electrode active material used zirconium oxide instead of magnesium oxide, the lithium transition metal composite oxide powder being such that the spinel phase and lithium phosphate were eccentrically populated to be more abundant on the surfaces of particles, zirconium was contained in the lamellar rock-salt phase and the spinel phase and concentrated on the surfaces of the particles. A battery was prepared as in Example 1 except that this powder was used as the positive electrode active material.

Example 12

Lithium transition metal composite oxide powder was prepared as in Example 1 except that the preparation process of the positive electrode active material used molybdenum oxide instead of magnesium oxide, the lithium transition metal composite oxide powder being such that the spinel phase and lithium phosphate were eccentrically populated to be more abundant on the surfaces of particles, molybdenum was contained in the lamellar rock-salt phase and the spinel phase and concentrated on the surfaces of the particles. A battery was prepared as in Example 1 except that this powder was used as the positive electrode active material.

Example 13

Lithium transition metal composite oxide powder was prepared as in Example 1 except that the preparation process of the positive electrode active material used tungsten oxide instead of magnesium oxide, the lithium transition metal composite oxide powder being such that the spinel phase and lithium phosphate were eccentrically populated to be more abundant on the surfaces of particles, tungsten was contained in the lamellar rock-salt phase and the spinel phase and concentrated on the surfaces of the particles. A battery was prepared as in Example 1 except that this powder was used as the positive electrode active material.

Example 14

Lithium transition metal composite oxide powder was prepared as in Example 1 except that the preparation process of the positive electrode active material used lithium sulfate instead of lithium phosphate, the lithium transition metal composite oxide powder being such that the spinel phase and lithium sulfate were eccentrically populated to be more abundant on the surfaces of particles, magnesium was contained in the lamellar rock salt phase and the spinel phase and concentrated on the surfaces of the particles. A battery was prepared as in Example 1 except that this powder was used as the positive electrode active material.

Example 15

Lithium transition metal composite oxide powder was prepared as in Example 1 except that the preparation process of the positive electrode active material used lithium fluoride instead of lithium phosphate, the lithium transition metal composite oxide powder being such that the spinel phase and lithium fluoride were eccentrically populated to be more abundant on the surfaces of particles, magnesium was contained in the lamellar rock-salt phase and the spinel phase and concentrated on the surfaces of the particles. A battery was prepared as in Example 1 except that this powder was used as the positive electrode active material.

Example 16

Lithium transition metal composite oxide powder was prepared as in Example 2 except that the preparation process of the positive electrode active material used lithium fluoride instead of lithium phosphate, the lithium transition metal composite oxide powder being such that the spinel phase and lithium fluoride were eccentrically populated to be more abundant on the surfaces of particles, magnesium was contained in the lamellar rock-salt phase and the spinel phase and concentrated on the surfaces of the particles. A battery was prepared as in Example 1 except that this powder was used as the positive electrode active material.

Example 17

Lithium transition metal composite oxide powder was prepared as in Example 1 except that the preparation process of the positive electrode active material did not add lithium phosphate, the lithium transition metal composite oxide powder being such that the spinel phase was eccentrically populated to be more abundant on the surfaces of particles, magnesium was contained in the lamellar rock-salt phase and the spinel phase and concentrated on the surfaces of the particles. A battery was prepared as in Example 1 except that this powder was used as the positive electrode active material.

Example 18

Lithium transition metal composite oxide powder was prepared as in Example 2 except that the preparation process of the positive electrode active material did not add lithium phosphate, the lithium transition metal composite oxide powder being such that the spinel phase was eccentrically populated to be more abundant on the surfaces of particles, magnesium was contained in the lamellar rock salt-like phase and the spinel phase and concentrated on the surfaces of the particles. A battery was prepared as in Example 1 except that this powder was used as the positive electrode active material.

Example 19

Transition metal composite oxide powder was prepared as in Example 1 except that the preparation process of the positive electrode active material was changed in the mixing amount such that the concentration of the lithium magnesium-containing cobalt oxide fine powder would be 80 ppm, the transition metal composite oxide powder being such that the spinel phase and lithium phosphate were eccentrically populated to be more abundant on the surfaces of particles, magnesium was contained in the lamellar rock-salt phase and the spinel phase and concentrated on the surfaces of the particles. A battery was prepared as in Example 1 except that this powder was used as the positive electrode active material.

Example 20

Lithium transition metal composite oxide powder was prepared as in Example 1 except that the preparation process of the positive electrode active material was changed in the mixing amount such that the concentration of the lithium magnesium-containing cobalt oxide fine powder would be 300 ppm, the lithium transition metal composite oxide powder being such that the spinel phase and lithium phosphate were eccentrically populated to be more abundant on the surfaces of particles, magnesium was contained in the lamellar rock-salt phase and the spinel phase and concentrated on the surfaces of the particles. A battery was prepared as in Example 1 except that this powder was used as the positive electrode active material.

Example 21

Lithium transition metal composite oxide powder was prepared as in Example 1 except that the preparation process of the positive electrode active material was changed in the mixing amount such that the concentration of the lithium magnesium-containing cobalt oxide fine powder would be 1200 ppm, the lithium transition metal composite oxide powder being such that the spinel phase and lithium phosphate were eccentrically populated to be more abundant on the surfaces of particles, magnesium was contained in the lamellar rock-salt phase and the spinel phase and concentrated on the surfaces of the particles. A battery was prepared as in Example 1 except that this powder was used as the positive electrode active material.

Example 22

Lithium transition metal composite oxide powder was prepared as in Example 1 except that the preparation process of the positive electrode active material was changed in the mixing amount such that the concentration of the lithium magnesium-containing cobalt oxide fine powder would be 1500 ppm, the lithium transition metal composite oxide powder being such that the spinel phase and lithium phosphate were eccentrically populated to be more abundant on the surfaces of particles, magnesium was contained in the lamellar rock-salt phase and the spinel phase and concentrated on the surfaces of the particles. A battery was prepared as in Example 1 except that this powder was used as the positive electrode active material.

Example 23

Lithium transition metal composite oxide powder A was prepared as in Example 1 except that the preparation process of the positive electrode active material was changed in the particle diameter of cobalt nickel hydroxide and in the amount of magnesium oxide powder added in lithium nickel cobaltate to 0.6 mol %, and in the mixing amount such that the concentration of the lithium magnesium-containing cobalt oxide fine powder would be 400 ppm, the lithium transition metal composite oxide powder being such that 50% particle diameter D50 was 23 μm.

Lithium transition metal composite oxide powder B was prepared as in Example 1 except that the preparation process of the positive electrode active material was changed in the particle diameter of cobalt nickel hydroxide and in the amount of magnesium oxide powder added in lithium nickel cobaltate to 2 mol %, and in the mixing amount such that the concentration of the lithium magnesium-containing cobalt oxide fine powder would be 1000 ppm, the lithium transition metal composite oxide powder being such that 50% particle diameter was 6 μm.

The powder A and powder B thus prepared as above was mixed in a mass ratio of A:B=75:25, thereby preparing a lithium transition metal composite oxide as targeted. A battery was prepared as in Example 1 except that this powder was used as the positive electrode active material.

Example 24

Composite powder as a positive electrode active material was prepared as below. To begin with, lithium transition metal composite oxide powder was prepared as in Example 1.

Next, into the lithium transition metal composite oxide powder thus prepared, magnesium oxide powder was mixed in such a way that a concentration of the magnesium oxide powder would be 100 ppm, thereby preparing the composite powder. A battery was prepared as in Example 1, except that the composite powder was used as the positive electrode active material.

Example 25

Composite powder as a positive electrode active material was prepared as below. To begin with, lithium transition metal composite oxide powder was prepared as in Example 3. Next, into the lithium transition metal composite oxide powder thus prepared, aluminum oxide powder was mixed in such a way that a concentration of the aluminum oxide powder would be 100 ppm, thereby preparing the composite powder. A battery was prepared as in Example 1, except that the composite powder was used as the positive electrode active material.

Example 26

Composite powder as a positive electrode active material was prepared as below. To begin with, lithium transition metal composite oxide powder was prepared as in Example 5. Next, into the lithium transition metal composite oxide powder thus prepared, titanium oxide powder was mixed in such a way that a concentration of the titanium oxide powder would be 100 ppm, thereby preparing the composite powder. A battery was prepared as in Example 1, except that the composite powder was used as the positive electrode active material.

Example 27

Composite powder as a positive electrode active material was prepared as below. To begin with, lithium transition metal composite oxide powder was prepared as in Example 7. Next, into the lithium transition metal composite oxide powder thus prepared, manganese oxide powder was mixed in such a way that a concentration of the manganese oxide powder would be 100 ppm, thereby preparing the composite powder. A battery was prepared as in Example 1, except that the composite powder was used as the positive electrode active material.

Example 28

Composite powder as a positive electrode active material was prepared as below. To begin with, lithium transition metal composite oxide powder was prepared as in Example 9. Next, into the lithium transition metal composite oxide powder thus prepared, yttrium oxide powder was mixed in such a way that a concentration of the yttrium oxide powder would be 100 ppm, thereby preparing the composite powder. A battery was prepared as in Example 1, except that the composite powder was used as the positive electrode active material.

Example 29

Composite powder as a positive electrode active material was prepared as below. To begin with, lithium transition metal composite oxide powder was prepared as in Example 10. Next, into the lithium transition metal composite oxide powder thus prepared, zirconium oxide powder was mixed in such a way that a concentration of the zirconium oxide powder would be 100 ppm, thereby preparing the composite powder. A battery was prepared as in Example 1, except that the composite powder was used as the positive electrode active material.

Example 30

Composite powder as a positive electrode active material was prepared as below. To begin with, lithium transition metal composite oxide powder was prepared as in Example 12. Next, into the lithium transition metal composite oxide powder thus prepared, molybdenum oxide powder was mixed in such a way that a concentration of the molybdenum oxide powder would be 100 ppm, thereby preparing the composite powder. A battery was prepared as in Example 1, except that the composite powder was used as the positive electrode active material.

Example 31

Composite powder as a positive electrode active material was prepared as below. To begin with, lithium transition metal composite oxide powder was prepared as in Example 13. Next, into the lithium transition metal composite oxide powder thus prepared, tungsten oxide powder was mixed in such a way that a concentration of the tungsten oxide powder would be 100 ppm, thereby preparing the composite powder. A battery was prepared as in Example 1, except that the composite powder was used as the positive electrode active material.

Comparative Example 1

Lithium transition metal composite oxide powder was prepared as in Example 1 except that the preparation process of the positive electrode active material did not add the lithium magnesium-containing cobaltate fine powder, the lithium transition metal composite oxide powder being such that lithium phosphate was eccentrically populated to be more abundant in the spinel phase and on the surfaces of particles, magnesium was contained in the lamellar rock salt phase and the spinel phase and concentrated on the surfaces of the particles. A battery was prepared as in Example 1 except that this powder was used as the positive electrode active material.

Comparative Example 2

Lithium transition metal composite oxide powder was prepared as in Example 2 except that the preparation process of the positive electrode active material did not add the lithium magnesium-containing cobaltate fine powder, the lithium transition metal composite oxide powder being such that lithium phosphate was eccentrically populated to be more abundant in the spinel phase and on the surfaces of particles, magnesium was contained in the lamellar rock-salt phase and the spinel phase and concentrated on the surfaces of the particles. A battery was prepared as in Example 1 except that this powder was used as the positive electrode active material.

Comparative Example 3

Lithium transition metal composite oxide powder was prepared as in Example 1 except that the preparation process of the positive electrode active material did not include distributing magnesium oxide on the surfaces of the lithium nickel cobaltate particles, the lithium transition metal composite oxide powder being such that the spinel phase and lithium phosphate were eccentrically populated to be more abundant on the surfaces of particles, magnesium was contained in the lamellar rock salt-like phase and the spinel phase and concentrated on the surfaces of the particles. A battery was prepared as in Example 1 except that this powder was used as the positive electrode active material.

(Post 45° C. Cycle Maintaining Ratio)

To begin with, the batteries thus prepared were charged under such conditions that an environmental temperature was 45° C., a charging voltage was 4.40 V, a charging current was 1000 mA, and a charging time was 2.5 hours, and then discharged under such conditions that a discharging current was 800 mA and a termination voltage 2.75 V, and an initial discharging capacity thereof was measured. Next, the charging and discharging were repeated under conditions similar to those for measuring the initial discharging capacity, and a discharging capacity at the 500th cycle was measured. A post-cycle maintaining ratio with respect to the initial discharging capacity was worked out by the following equation.

"Post cycle maintaining ratio" (%)=("discharging capacity at 500th cycle"/"initial discharging capacity")×100(%)

(Post 60° C. Storage Maintaining Ratio)

To begin with, an initial discharging capacity was measured in a manner similar to that for the "post 45° C. cycle maintaining ratio". Then, after the batteries were charged in the same conditions for working out the initial discharging capacity, the batteries were stored for 14 days at an environmental temperature of 60° C. Next, a discharging capacity was measured in a manner similar to that for working out the initial discharging capacity. A post storage maintaining ratio with respect to the initial discharging capacity was worked out by the following equation.

"Post storage maintaining ratio" (%)=("discharging capacity after stored at 60° C. for 14 days"/"initial discharging capacity")×100(%)

Tables 1 and 2 shows the preparation conditions and evaluation results of Examples 1 to 18.

TABLE 1

| | Base material with lamellar rock salt-like structure | Cubic crystal spinel phase | X1 | Ratio of spinel phase to base material (ppm) |
|---|---|---|---|---|
| Example 1 | Lithium nickel cobaltate + MgO__1.0% | $CoCO_3 + Li_2CO_3 + MgO$ | Mg | 500 |
| Example 2 | Lithium cobaltate + MgO__1.0% | $CoCO_3 + Li_2CO_3 + MgO$ | Mg | 500 |
| Example 3 | Lithium nickel cobaltate + AL(OH)$_3$__1.0% | $CoCO_3 + Li_2CO_3 + AL(OH)_3$ | Al | 500 |
| Example 4 | Lithium cobaltate + AL(OH)$_3$__1.0% | $CoCO_3 + Li_2CO_3 + AL(OH)_3$ | Al | 500 |
| Example 5 | Lithium nickel cobaltate + TiO$_2$__1.0% | $CoCO_3 + Li_2CO_3 + TiO_2$ | Ti | 500 |
| Example 6 | Lithium cobaltate + TiO$_2$__1.0% | $CoCO_3 + Li_2CO_3 + TiO_2$ | Ti | 500 |
| Example 7 | Lithium nickel cobaltate + Mn(CO$_3$)$_2$__1.0% | $CoCO_3 + Li_2CO_3 + Mn(CO_3)_2$ | Mn | 500 |
| Example 8 | Lithium cobaltate + Mn(CO$_3$)$_2$__1.0% | $CoCO_3 + Li_2CO_3 + Mn(CO_3)_2$ | Mn | 500 |
| Example 9 | Lithium nickel cobaltate + Y$_2$O$_3$__1.0% | $CoCO_3 + Li_2CO_3 + Y_2O_3$ | Y | 500 |
| Example 10 | Lithium nickel cobaltate + ZrO$_2$__1.0% | $CoCO_3 + Li_2CO_3 + ZrO_2$ | Zr | 500 |
| Example 11 | Lithium cobaltate + ZrO$_2$__1.0% | $CoCO_3 + Li_2CO_3 + ZrO_2$ | Zr | 500 |
| Example 12 | Lithium nickel cobaltate + MoO$_3$__1.0% | $CoCO_3 + Li_2CO_3 + MoO_3$ | Mo | 500 |
| Example 13 | Lithium nickel cobaltate + Wo$_3$__1.0% | $CoCO_3 + Li_2CO_3 + WO_3$ | W | 500 |
| Example 14 | Lithium nickel cobaltate + MgO__1.0% | $CoCO_3 + Li_2CO_3 + MgO$ | Mg | 500 |
| Example 15 | Lithium nickel cobaltate + MgO__1.0% | $CoCO_3 + Li_2CO_3 + MgO$ | Mg | 500 |
| Example 16 | Lithium cobaltate + MgO__1.0% | $CoCO_3 + Li_2CO_3 + MgO$ | Mg | 500 |
| Example 17 | Lithium nickel cobaltate + MgO__1.0% | $CoCO_3 + Li_2CO_3 + MgO$ | Mg | 500 |
| Example 18 | Lithium cobaltate + MgO__1.0% | $CoCO_3 + Li_2CO_3 + MgO$ | Mg | 500 |

TABLE 2

| | Compound with element X2 | X2 | Existing ratio of compound with element X2 (ppm) | Particle diameter (μm) | Oxide with element X1 in independent particle form | Post 45° C. cycle maintaining ratio | Post 60° C. storage maintaining ratio |
|---|---|---|---|---|---|---|---|
| Example 1 | $Li_3PO_4$ | P | 400 | 16 | None | 86% | 90% |
| Example 2 | $Li_3PO_4$ | P | 400 | 16 | None | 84% | 88% |
| Example 3 | $Li_3PO_4$ | P | 400 | 16 | None | 81% | 87% |
| Example 4 | $Li_3PO_4$ | P | 400 | 16 | None | 80% | 82% |
| Example 5 | $Li_3PO_4$ | P | 400 | 16 | None | 85% | 85% |
| Example 6 | $Li_3PO_4$ | P | 400 | 16 | None | 82% | 82% |
| Example 7 | $Li_3PO_4$ | P | 400 | 16 | None | 83% | 91% |
| Example 8 | $Li_3PO_4$ | P | 400 | 16 | None | 84% | 86% |
| Example 9 | $Li_3PO_4$ | P | 400 | 16 | None | 87% | 85% |
| Example 10 | $Li_3PO_4$ | P | 400 | 16 | None | 88% | 86% |
| Example 11 | $Li_3PO_4$ | P | 400 | 16 | None | 84% | 83% |
| Example 12 | $Li_3PO_4$ | P | 400 | 16 | None | 90% | 82% |
| Example 13 | $Li_3PO_4$ | P | 400 | 16 | None | 89% | 81% |
| Example 14 | $Li_2SO_4$ | S | 400 | 16 | None | 83% | 86% |
| Example 15 | LiF | F | 400 | 16 | None | 84% | 85% |
| Example 16 | LiF | F | 400 | 16 | None | 84% | 87% |
| Example 17 | None | — | — | 16 | None | 76% | 72% |
| Example 18 | None | — | — | 16 | None | 76% | 75% |

Tables 3 and 4 shows the preparation conditions and evaluation results of Examples 19 to 31 and Comparative Examples 1 to 3.

TABLE 3

| | base material with lamellar rock salt-like structure | Cubic crystal spinel phase | X1 | Ratio of spinel phase to base material (ppm) |
|---|---|---|---|---|
| Example 19 | Lithium nickel cobaltate + MgO_1.0% | $CoCO_3 + Li_2CO_3 + MgO$ | Mg | 80 |
| Example 20 | Lithium nickel cobaltate + MgO_1.0% | $CoCO_3 + Li_2CO_3 + MgO$ | Mg | 300 |
| Example 21 | Lithium nickel cobaltate + MgO_1.0% | $CoCO_3 + Li_2CO_3 + MgO$ | Mg | 1200 |
| Example 22 | Lithium cobaltate + MgO_1.0% | $CoCO_3 + Li_2CO_3 + MgO$ | Mg | 1250 |
| Example 23 | Lithium nickel cobaltate + MgO_0.6% | $CoCO_3 + Li_2CO_3 + MgO$ | Mg | 400 |
| | Lithium nickel cobaltate + MgO_2.0% | $CoCO_3 + Li_2CO_3 + MgO$ | Mg | 1000 |
| Example 24 | Lithium nickel cobaltate + MgO_1.0% | $CoCO_3 + Li_2CO_3 + MgO$ | Mg | 500 |
| Example 25 | Lithium nickel cobaltate + AL(OH)$_3$_1.0% | $CoCO_3 + Li_2CO_3 + AL(OH)_3$ | Al | 500 |
| Example 26 | Lithium nickel cobaltate + TiO$_2$_1.0% | $CoCO_3 + Li_2CO_3 + TiO_2$ | Ti | 500 |
| Example 27 | Lithium nickel cobaltate + Mn(CO$_3$)$_2$_1.0% | $CoCO_3 + Li_2CO_3 + Mn(CO_3)_2$ | Mn | 500 |
| Example 28 | Lithium nickel cobaltate + Y$_2$O$_3$_1.0% | $CoCO_3 + Li_2CO_3 + Y_2O_3$ | Y | 500 |
| Example 29 | Lithium nickel cobaltate + ZrO$_2$_1.0% | $CoCO_3 + Li_2CO_3 + ZrO_2$ | Zr | 500 |
| Example 30 | Lithium nickel cobaltate + MoO$_3$_1.0% | $CoCO_3 + Li_2CO_3 + MoO_3$ | Mo | 500 |
| Example 31 | Lithium nickel cobaltate + WO$_3$_1.0% | $CoCO_3 + Li_2CO_3 + WO_3$ | W | 500 |
| Comparative Example 1 | Lithium nickel cobaltate + MgO_1.0% | None | Mg | — |
| Comparative Example 2 | Lithium cobaltate + MgO_1.0% | None | Mg | — |
| Comparative Example 1 | Lithium nickel cobaltate | $CoCO_3 + Li_2CO_3 + MgO$ | Mg | 500 |

TABLE 4

| | Compound with element X2 | X2 | Existing ratio of compound with element X2 (ppm) | Particle diameter (μm) | Oxide with element X1 in independent particle form | Post 45° C. cycle maintaining ratio | Post 60° C. storage maintaining ratio |
|---|---|---|---|---|---|---|---|
| Example 19 | $Li_3PO_4$ | P | 400 | 16 | None | 85% | 80% |
| Example 20 | $Li_3PO_4$ | P | 400 | 16 | None | 86% | 86% |
| Example 21 | $Li_3PO_4$ | P | 400 | 16 | None | 81% | 86% |
| Example 22 | $Li_3PO_4$ | P | 400 | 16 | None | 62% | 72% |
| Example 23 | $Li_3PO_4$ | P | 400 | 23 | None | 93% | 92% |
| | $Li_3PO_4$ | P | 400 | 6 | None | | |
| Example 24 | $Li_3PO_4$ | P | 400 | 16 | MgO 100 ppm | 90% | 92% |
| Example 25 | $Li_3PO_4$ | P | 400 | 16 | $Al_2O_3$ 100 ppm | 85% | 89% |
| Example 26 | $Li_3PO_4$ | P | 400 | 16 | $TiO_2$ 100 ppm | 88% | 87% |

TABLE 4-continued

|  | Compound with element X2 | X2 | Existing ratio of compound with element X2 (ppm) | Particle diameter (μm) | Oxide with element X1 in independent particle form | Post 45° C. cycle maintaining ratio | Post 60° C. storage maintaining ratio |
|---|---|---|---|---|---|---|---|
| Example 27 | $Li_3PO_4$ | P | 400 | 16 | $MnO_2$ 100 ppm | 86% | 92% |
| Example 28 | $Li_3PO_4$ | P | 400 | 16 | $Y_2O_3$ 100 ppm | 90% | 88% |
| Example 29 | $Li_3PO_4$ | P | 400 | 16 | $ZrO_2$ 100 ppm | 90% | 86% |
| Example 30 | $Li_3PO_4$ | P | 400 | 16 | $MoO_3$ 100 ppm | 90% | 83% |
| Example 31 | $Li_3PO_4$ | P | 400 | 16 | $WO_3$ 100 ppm | 90% | 83% |
| Comparative Example 1 | $Li_3PO_4$ | P | 400 | 16 | None | 41% | 23% |
| Comparative Example 2 | $Li_3PO_4$ | P | 400 | 16 | None | 35% | 39% |
| Comparative Example 3 | $Li_3PO_4$ | P | 400 | 16 | None | 49% | 40% |

Tables 1 to 4 demonstrate the following points.

The comparison between the evaluation results of Examples 1 to 13 and Comparative Examples 1 to 3 demonstrate that the configuration in which the spinel phase including Li and at least one element X1 selected from the group consisting of Mg, Al, Ti, Mn, Y, Zr, Mo, and W is present on the surfaces of the lithium transition metal composite oxide particles, and the element X1 is commonly present in the lamellar rock-salt phase makes it possible to attain a high post cycle maintaining ratio and a high post storage maintaining ratio at a high temperature.

The comparisons between the evaluation results of Examples 1, 2, and 14 to 18 demonstrate that the configuration in which a compound of at least one element X2 selected from the group consisting of S, P, and F is included in the lithium transition metal composite oxide particles makes it possible to attain an even higher post cycle maintaining ratio and an even higher post storage maintaining ratio at a high temperature.

The comparisons between the evaluation results of Example 1 and Examples 19 to 22 demonstrate that it is preferable that the content amount of the spinel phase be not less than 80 ppm or not more than 1200 ppm for the sake of further improving the post cycle maintaining ratio and the post storage maintaining ratio.

The comparisons between the evaluation results of Examples 21 and 23 demonstrate that for the sake of further improving the post cycle maintaining ratio and the post storage maintaining ratio, it is preferable that two types of particle powder having different average particle diameters are mixed, and the particle powder with a smaller average particle diameter of the two types of particle powder had greater content ratios of the element X1 and the spinel phase than those in the particle powder with a larger average particle diameter of the two types of particle powder.

The comparisons between the evaluation results of Examples 1 and 24, Examples 3 and 25, Examples 5 and 26, Examples 7 and 27, Examples 9 and 28, and Examples 10 and 29, Examples 12 and 30, and Examples 13 and 31 demonstrate that it is preferable that the particles including the oxide including the element X1 be contained in the positive electrode active material in such a way that the particles exist independent of the lithium transition metal composite oxide particles, for the sake of further improving the post cycle maintaining ratio and the post storage maintaining ratio.

The embodiments, modifications thereof, and examples of the present disclosure have been specifically described above. However, the present disclosure is not limited to the above-described embodiments, modifications thereof, and examples. Various modifications of the present technology can be made without departing from the technical spirit of the present disclosure.

For example, the configurations, the methods, the processes, the shapes, the materials, the numerical values, and the like mentioned in the above-described embodiments, modifications thereof, and examples are merely examples. Different configurations, methods, processes, shapes, materials, numerical values, and the like may be used, as necessary. In addition, chemical formulas of compounds and the like are representative, and the general names of the same compounds are not limited to the described valence.

Further, configuration, methods, processes, shapes, materials, numerical values and the like in the above-described embodiments, modifications thereof, and examples may be combined insofar as they are not departing from the spirit of the present disclosure.

Moreover, for example, the embodiments described above explain the batteries of cylinder shape or laminate shape as examples, but the shape of the battery is not limited to these shapes and may be a rectangular shape, a coin-like shape, a button shape, or the like.

Furthermore, the embodiments described above explain the examples where the present disclosure is applied to a battery including, as the electrolyte, a non-aqueous electrolyte solution or a gel-form electrolyte, but the kind of battery is not limited to these. For example, the present disclosure is also applicable to batteries including a solid electrolyte. As the solid electrolyte, either inorganic solid electrolytes or the polymer solid electrolytes may be applicable, as long as they have a lithium ion conductivity. The inorganic solid electrolyte may be a known inorganic solid electrolyte such as lithium nitride, lithium iodine, lithium phosphate, lithium sulfide, and the like. The polymer solid electrolyte includes an electrolyte salt and a polymer compound for dissolving the electrolyte salt therein, and the polymer compound may be, for example, solely an ether-type polymer such as poly(ethylene oxide) or cross-linked poly(ethylene oxide), poly(methacrylate) ester type, acrylate type, or the like, or a copolymer or mixture including any combination of them in its molecule.

Moreover, the production method of the electrode is not particularly limited in the present disclosure, but examples of the production method include a method including adding a well-known binder, conductive agent, etc. in an active material, adding a solvent thereto, and applying the resultant, a method including adding a well-known binder etc. into an active agent, heating a mixture thus prepared, and applying the mixture thus heated, a method including mixing an active material solely or a mixture of the active material and a conductive agent and a binder by molding or the like so as to form a shaped electrode on a current collector, or the like. Moreover, it is possible to form an electrode with a greater strength by molding the active material by pressing under heating with or without the binder added therein. Moreover, the active materials having different composition, particle properties, particle shape, etc. may be used in combination.

Furthermore, the production method of the battery is not particularly limited in the present disclosure, and examples of the production method includes a method including winding, around a winding core, a laminate of a positive electrode and a negative electrode with a separator interposed therebetween, a method including laminating the electrodes and the separator sequentially in an appropriate order, and the like.

In addition, the present disclosure is described in further detail according to an embodiment.

(1)
A positive electrode active material, including:
powder of composite particles compositely including a lithium transition metal composite oxide having a lamellar rock-salt structure and a spinel phase,
the spinel phase including an oxide including lithium and at least one element X1 selected from the group consisting of magnesium, aluminum, titanium, manganese, yttrium, zirconium, molybdenum, and tungsten, and
the lithium transition metal composite oxide mainly including nickel or cobalt and containing the at least one element X1.

(2)
The positive electrode active material according to (1), in which a concentration of the at least one element X1 is higher on surfaces of the composite particles than inside of the composite particles.

(3)
The positive electrode active material according to (1) or (2), in which the spinel phase is eccentrically populated to be more abundant on the surfaces of the composite particles.

(4)
The positive electrode active material according to any one of (1) to (3), in which the composite particles further compositely include a compound including at least one element X2 selected from the group consisting of sulfur, phosphorous, and fluorine.

(5)
The positive electrode active material according to (4), in which the compound including the at least one element X2 is eccentrically populated to be more abundant on either or both of the surfaces and the crystal grain boundary of the composite particles.

(6)
The positive electrode active material according to any one of (1) to (5), in which a content amount of the spinel phase in the composite particles is not less than 80 ppm but not more than 1200 ppm.

(7)
The positive electrode active material according to any one of (1) to (6), in which the powder of the composite particles includes two or more kinds of particle powder having different average particle diameters, the two or more kinds of particle powder being different in at least one of a content amount of the at least one element X1 in the composite particles, and a content ratio of the spinel phase in the composite particles.

(8)
The positive electrode active material according to (7), in which the two or more kinds of the particle powder is such that particle powder with a smaller average particle diameter is higher in at least one of a content amount of the at least one element X1 in the composite particles, and a content ratio of the spinel phase in the composite particles.

(9)
The positive electrode active material according to any one of (1) to (8), further including powder of particles including an oxide including the at least one element X1,
the particles existing independently of the composite particles.

(10)
A positive electrode including the positive electrode active material according to any one of (1) to (9).

(11)
A battery, including:
a positive electrode including the positive electrode active material according to any one of (1) to (9);
a negative electrode; and
an electrolyte.

(12)
A battery pack, including:
the battery according to (11); and
a control unit configured to control the battery.

(13)
An electronic device, comprising the battery according to (11), and
the electronic device being configured to receive power supply from the battery.

(14)
An electric vehicle, including:
the battery according to (11);
a converting device configured to receive power supply from the battery and convert the power into a driving power for the vehicle; and
a control device configured to perform information processing for vehicle control on the basis of information on the battery.

(15)
A power storage device, including the battery according to (11), and
the power storage device being configured to provide power supply to an electronic device connected to the battery.

(16)
A power system including the battery according to (11), and the power system being configured to receive power supply from the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A positive electrode active material, comprising:
powder of composite particles including a lithium transition metal composite oxide having a lamellar rock-salt structure and a spinel phase,
wherein the spinel phase includes an oxide including lithium and at least a first element X1 selected from the group consisting of magnesium, aluminum, titanium, manganese, yttrium, zirconium, molybdenum, and tungsten, and wherein the lithium transition metal composite oxide includes nickel or cobalt and the first element X1; and powder of particles including an oxide including the first element X1, wherein the particles exist independently of the composite particles.

2. The positive electrode active material according to claim 1, wherein a concentration of the first element X1 is higher on surfaces of the composite particles than inside of the composite particles.

3. The positive electrode active material according to claim 1, wherein the spinel phase is eccentrically populated to be more abundant on the surfaces of the composite particles.

4. The positive electrode active material according to claim 1, wherein the composite particles further include a compound including a second element X2 selected from the group consisting of sulfur, phosphorous, and fluorine.

5. The positive electrode active material according to claim 4, wherein the compound including the second element X2 is eccentrically populated to be more abundant on either or both of the surfaces and a crystal grain boundary of the composite particles.

6. The positive electrode active material according to claim 1, wherein a content amount of the spinel phase in the composite particles is from 80 ppm to 1200 ppm.

7. The positive electrode active material according to claim 1, wherein the powder of the composite particles includes two or more kinds of particle powders having different average particle diameters, and wherein the two or more kinds of particle powders are different in at least one of a content amount of the first element X1 in the composite particles, and a content ratio of the spinel phase in the composite particles.

8. The positive electrode active material according to claim 7, wherein the two or more kinds of the particle powders are such that particle powder with a smaller average particle diameter is higher in at least one of a content amount of the first element X1 in the composite particles, and a content ratio of the spinel phase in the composite particles.

9. A positive electrode comprising the positive electrode active material according to claim 1.

10. A battery, comprising:
a positive electrode including the positive electrode active material according to claim 1;
a negative electrode; and
an electrolyte.

11. A battery pack, comprising:
the battery according to claim 10; and
a controller configured to control the battery.

12. An electronic device, comprising the battery according to claim 10,
wherein the electronic device is configured to receive power supply from the battery.

13. An electric vehicle, comprising:
the battery according to claim 10;
a converter configured to receive power supply from the battery and convert the power into a driving power for the vehicle; and
a controller configured to perform information processing for vehicle control on a basis of information on the battery.

14. A power storage device, comprising the battery according to claim 10, and
wherein the power storage device is configured to provide power supply to an electronic device connected to the battery.

15. A power system comprising the battery according to claim 10,
wherein the power system is configured to receive power supply from the battery.

* * * * *